United States Patent
Schmidt et al.

(10) Patent No.: US 9,994,678 B2
(45) Date of Patent: *Jun. 12, 2018

(54) PROCESS FOR THE CONTINUOUS PREPARATION OF AN ALIPHATIC OR PARTIALLY AROMATIC POLYAMIDE

(71) Applicant: BASF SE, Ludwigshafen (DE)

(72) Inventors: Christian Schmidt, Ludwigshafen (DE); Joachim Clauss, Darmstadt (DE); Axel Wilms, Frankenthal (DE); Volker Rauschenberger, Eisenberg (DE); Gad Kory, Gaiberg (DE); Stefan Schwiegk, Neustadt (DE); Arnold Schneller, Seeheim-Jugenheim (DE); Achim Stammer, Freinsheim (DE); Frank Niedermaier, Ladenburg (DE); Bernd Hackel, Mutterstadt (DE)

(73) Assignee: BASF SE, Ludwigshafen (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/896,945

(22) PCT Filed: Jun. 11, 2014

(86) PCT No.: PCT/EP2014/062105
§ 371 (c)(1),
(2) Date: Dec. 9, 2015

(87) PCT Pub. No.: WO2014/198759
PCT Pub. Date: Dec. 18, 2014

(65) Prior Publication Data
US 2016/0145390 A1    May 26, 2016

(30) Foreign Application Priority Data

Jun. 12, 2013  (EP) .................................... 13171651
Mar. 28, 2014  (EP) .................................... 14162299

(51) Int. Cl.
*C08G 69/28* (2006.01)
*C08G 69/26* (2006.01)

(52) U.S. Cl.
CPC ............. *C08G 69/28* (2013.01); *C08G 69/26* (2013.01); *C08G 69/265* (2013.01)

(58) Field of Classification Search
CPC ..................................................... C08G 69/28
See application file for complete search history.

(56) References Cited

U.S. PATENT DOCUMENTS 3,900,450 A    8/1975   Jaswal et al.
4,019,866 A *  4/1977   Jaswal ................... B01D 3/322
                                                    422/132

(Continued)

FOREIGN PATENT DOCUMENTS

CA    2153862 A1    1/1996
CN    1411483 A     4/2003

(Continued)

OTHER PUBLICATIONS

Computer-generated translation of JP 2008081634.
U.S. Appl. No. 13/588,446, filed Aug. 17, 2012.
U.S. Appl. No. 14/016,504, filed Sep. 3, 2013.
U.S. Appl. No. 14/016,520, filed Sep. 3, 2013.

(Continued)

*Primary Examiner* — Michael Pepitone
(74) *Attorney, Agent, or Firm* — Marshall, Gerstein & Borun LLP

(57) ABSTRACT

The present invention relates to a process for the preparation of an aliphatic or partially aromatic polyamide, in which an aqueous composition of the monomers is subjected to an oligomerization at elevated temperature and increased pressure, the reaction mixture is optionally subjected to a first decompression to reduce the water content, the (optionally decompressed) reaction mixture is heated within a short time to a temperature above the melting temperature of the polyamides and the heated reaction mixture is subjected to (Continued)

a (further) decompression to reduce the water content and to an after-polymerization.

30 Claims, 2 Drawing Sheets

(56) References Cited

U.S. PATENT DOCUMENTS

| | | | |
|---|---|---|---|
| 4,060,517 A | | 11/1977 | Mertes et al. |
| 4,831,108 A | * | 5/1989 | Richardson ............ C08G 63/78 422/129 |
| 5,418,068 A | | 5/1995 | Caluori et al. |
| 5,708,125 A | | 1/1998 | Liedloff et al. |
| 6,107,449 A | | 8/2000 | Wiltzer et al. |
| 2002/0077419 A1 | | 6/2002 | Willis-Papi et al. |
| 2003/0023027 A1 | | 1/2003 | Mohrschladt et al. |
| 2006/0122360 A1 | | 6/2006 | Tsujii et al. |

FOREIGN PATENT DOCUMENTS

| | | |
|---|---|---|
| DE | 4142978 C1 | 12/1992 |
| DE | 4329676 A1 | 3/1994 |
| EP | 0 123 377 A2 | 10/1984 |
| EP | 0 693 515 A1 | 1/1996 |
| EP | 0 97 6774 A2 | 2/2000 |
| EP | 1 007 582 A1 | 6/2000 |
| JP | 2000-510892 A | 8/2000 |
| JP | 2008081634 A | 4/2008 |
| JP | 2011225830 A | 11/2011 |
| WO | WO-02/28941 A2 | 4/2002 |
| WO | WO-2004/055084 A2 | 7/2004 |

OTHER PUBLICATIONS

International Patent Application No. PCT/EP2014/054324, filed Mar. 6, 2014.
U.S. Appl. No. 14/199,436, filed Mar. 6, 2014.
International Patent Application No. PCT/EP2014/058797, filed Apr. 30, 2014.
International Patent Application No. PCT/EP2014/062101, filed Jun. 11, 2014.
International Patent Application No. PCT/EP2014/062102, filed Jun. 11, 2014.
International Patent Application No. PCT/EP2014/062103, filed Jun. 11, 2014.
International Patent Application No. PCT/EP2014/062114, filed Jun. 11, 2014.
International Patent Application No. PCT/EP2014/062116, filed Jun. 11, 2014.
International Patent Application No. PCT/EP2014/062119, filed Jun. 11, 2014.
International Patent Application No. PCT/EP2014/062121, filed Jun. 11, 2014.
International Patent Application No. PCT/EP2014/062122, filed Jun. 11, 2014.
International Patent Application No. PCT/EP2014/062124, filed Jun. 11, 2014.
U.S. Appl. No. 14/376,709, filed Aug. 5, 2014.
U.S. Appl. No. 14/760,605, filed Jul. 13, 2015.
Machine translation of JP 2011-225830.
Alewelt, W., et al., "Industrial Thermoplastics: Polyamide," *Plastics Handbook*, 3/4, Carl Hanser Publishing Company, 1998, Munich, pp. 42-71.

\* cited by examiner

PROCESS FOR THE CONTINUOUS PREPARATION OF AN ALIPHATIC OR PARTIALLY AROMATIC POLYAMIDE

CROSS-REFERENCE TO RELATED APPLICATIONS

This is the U.S. national phase of International Application No. PCT/EP2014/062105, filed Jun. 11, 2014, which claims the benefit of European Patent application No. 14162299.3, filed Mar. 28, 2014, and European Patent application No. 13171651.6, filed Jun. 12, 2013.

BACKGROUND OF THE INVENTION

The present invention relates to a process for preparing an aliphatic or semiaromatic polyamide, in which an aqueous composition of the monomers is subjected to an oligomerization at elevated temperature and elevated pressure, the reaction mixture is optionally subjected to a first expansion to reduce the water content, the (optionally expanded) reaction mixture is heated within a short time to a temperature above the melting temperature of the polyamides and the heated reaction mixture is subjected to a (further) expansion to reduce the water content and to a postpolymerization.

STATE OF THE ART

Polyamides are one of the polymers produced on a large scale globally and, in addition to the main fields of use in films, fibers and materials, serve for a multitude of further end uses. Among the polyamides, polyamide-6 (polycaprolactam) and polyamide-6,6 (Nylon, polyhexamethyleneadipamide) are the polymers prepared in the largest volumes. Polyamide-6,6 is prepared predominantly by polycondensation of what are called AH salt solutions, i.e. of aqueous solutions comprising adipic acid and 1,6-diaminohexane (hexamethylenediamine) in stoichiometric amounts. The conventional process for preparing polyamide-6 is the hydrolytic polymerization of ε-caprolactam, which is still of very great industrial significance. Conventional preparation processes for polyamide-6 and polyamide-6,6 are described, for example, in Kunststoffhandbuch, 3/4 Technische Thermoplaste: Polyamide [Plastics Handbook, 3/4 Industrial Thermoplastics: Polyamides], Carl Hanser Verlag, 1998, Munich, p. 42-71.

A further important group of polyamides is that of semicrystalline or amorphous thermoplastic semiaromatic polyamides, which have found a wide range of use as important industrial plastics. They are especially notable for their high thermal stability and are also referred to as high-temperature polyamides (HTPA). An important field of use of the HTPAs is the production of electrical and electronic components, and suitable polymers for use in soldering operations under lead-free conditions (lead free soldering) are especially those based on polyphthalamide (PPA). HTPAs serve, inter alia, for production of plug connectors, microswitches and -buttons and semiconductor components, such as reflector housings of light-emitting diodes (LEDs). A further important field of use of the HTPAs is in high-temperature automotive applications. Important properties here are good heat aging resistance, and high strength and toughness and weld seam strength of the polymers used. Amorphous HTPAs or those having very low crystalline contents are transparent and are especially suitable for applications where transparency is advantageous. Semicrystalline HTPAs are generally notable for long-term stability at high ambient temperature and are suitable, for example, for applications in the engine bay area.

The preparation of semiaromatic polyamides generally begins with the formation of an aqueous salt solution from at least one diamine and at least one dicarboxylic acid, and optionally further monomer components, such as lactams, ω-amino acids, monoamines, monocarboxylic acids, etc. It is also possible to prepare aliphatic polyamides proceeding from an aqueous salt solution. The formation of the salt solution is then followed by an oligomerization by polycondensation in the liquid aqueous phase. For the desired increase in molecular weight, however, it is necessary to remove water later in the process and to increase the reaction temperature. This stage of the process, with the transition from a high water concentration and low temperatures to a low water concentration and high temperatures places high demands on the process regime. For example, there is the risk that the polymer will precipitate out in an uncontrolled manner unless sufficient water is still present for solubilization and/or the temperature in the reaction zone is sufficiently low to be below the melting temperature of the reaction product.

To increase the molecular weight further, two alternative routes are available in principle. In the first variant, the oligomer formed is converted by dewatering to the solid phase and subjected to what is called a solid state polymerization (SSP). In the second variant, water is removed in a controlled manner and the temperature is increased to convert the aqueous solution to the melt for further polycondensation. In this context, the polymerization in the melt in particular is not unproblematic, since unwanted side reactions also take place at the high temperatures required, and these can adversely affect the product quality. At the end of the polymerization in the solid phase or in the melt, a polymer having a number-average molecular weight of 13 000 to 22 000 g/mol is generally obtained. To further increase the molecular weight, a postpolymerization may then follow if required.

EP 0 693 515 A1 describes a process for preparing precondensates of semicrystalline or amorphous, thermoplastically processible semiaromatic polyamides in a multistage batchwise operation comprising the following stages a) to e):

a) a salt formation phase for preparation of salt(s) from diamine(s) and dicarboxylic acid(s) and optionally partial prereaction to give low molecular weight oligoamides at temperatures between 120° C. and 220° C. and pressures of up to 23 bar, b) optionally the transfer of the solution from stage a) into a second reaction vessel or a stirred autoclave under the conditions which exist at the end of preparation thereof, c) the reaction phase, during which the conversion to the precondensates is promoted, through heating of the reactor contents to a given temperature and controlled adjustment of the partial steam pressure to a given value which is maintained by controlled release of steam or optionally controlled introduction of steam from a steam generator connected to the autoclave, d) a steady-state phase which has to be maintained for at least 10 minutes, in the course of which the temperature of the reactor contents and the partial steam pressure are each set to the values envisaged for the transfer of the precondensates into the downstream process stage, where the temperature of the reactor contents during phases c) and d) must not exceed 265° C. in the case of precondensates of semicrystalline (co)polyamides having a melting point of more than 280° C., and particular, more accurately defined boundary conditions in relation to the dependence of the minimum partial steam pressure $P_{H2O}$ (minimum) to be employed on the temperature of the reactor contents and the amide group concentration of the polymer have to be complied with for said semicrystalline (co)polyamides during phases c) and d), and e) a discharge phase, during which the precondensates can be supplied to a final reaction apparatus either directly in the molten state or after passing through the solid state and optionally further process stages.

A characteristic feature of the process of EP 0 693 515 A1 is that mass transfer with the environment is required over the entire reaction phase for formation of the precondensates, in order to keep the partial steam pressure at the given value. To maintain the partial steam pressure in the reaction phase and the stationary phase, it is necessary to remove the water formed in the polycondensation as steam from the reaction vessel at the start of the reaction. This inevitably leads to a loss of as yet unconverted monomers which are discharged together with the steam. If the parameters mentioned are not complied with exactly, there is the risk that the reaction system will become so water-deficient that the polyamides formed are no longer dissolved in the liquid phase and solidify spontaneously. The reaction product obtained is so water-deficient that conversion to the melt and postcondensation in the melt is impossible. Continuous transfer of the precondensate to a melt postcondensation is therefore impossible. EP 0 693 515 A1 therefore teaches spraying the precondensates, with instantaneous vaporization of the residual water to obtain a solid precursor. To obtain the desired high molecular weight, the prepolymer can be subjected to a postcondensation. However, EP 0 693 515 A1 does not contain any specific details of this postcondensation.

It has been found that, surprisingly, the above-described disadvantages of the process taught in EP 0 693 515 A1 can be avoided when the preparation of the polyamide oligomers is at first conducted in a single phase and preferably without mass transfer with the environment, i.e. without removal of water. At the end of the oligomerization zone, after the process according to the invention, discharge can be effected in liquid form, and there is no requirement for an intermediate isolation of a solid as obtained in the case of spray discharge. Advantageously, the liquid output from the process according to the invention, after decompression, can be subjected to rapid heating to a temperature above the melting temperature and to a further increase in molecular weight in the melt.

Thus, the loss of monomers, especially in the prepolymerization, can be avoided in an effective manner, and a high conversion and sufficient molecular weight can be achieved.

The process described in EP 0 693 515 A1 is a batchwise process which has to be concluded with an equilibration. In addition, it is necessary in the discharge phase to keep the pressure constant by feeding in steam. As in any batchwise process, however, there is the risk that there may be variation of properties both within one batch and between batches. It has now been found that, surprisingly, it is possible with the continuous process according to the invention to obtain a narrow-distribution polymer with high molecular weight even without an equilibration phase of the oligomers.

DE 41 42 978 describes a multilayer composite system for reusable packaging, composed of at least one copolyamide protective layer and at least one copolyamide barrier layer, the copolyamides used being prepared batchwise. According to the working examples, the copolyamides are prepared by a batchwise process in the melt in a simple pressure autoclave.

WO 2004/055084 describes semicrystalline, thermoplastically processible, semiaromatic copolyamides preparable by condensation of at least the following monomers or precondensates thereof: a) terephthalic acid, b) at least one dimerized fatty acid having up to 44 carbon atoms and c) at least one aliphatic diamine of the formula $H_2N-(CH_2)_x-NH_2$ in which x is an integer of 4-18. With regard to the preparation of the copolyamides, there is merely a general reference to known processes.

WO 02/28941 describes a continuous process for hydrolytic polymerization of polyamides, comprising:

a) polymerizing an aqueous salt solution of diacids and diamines under conditions of temperature and pressure sufficient to yield a reaction mixture in multiple phases, but for a time sufficient to avoid phase separation, b) transferring heat into said reaction mixture while reducing pressure of said reaction mixture sufficient to remove the water therefrom without solidification thereof, c) further polymerizing said reaction mixture having the water removed and until the desired molecular weight is achieved.

Especially in the early stages of removing the water and increasing the molecular weight, good mixing of the reaction mixture is required. With regard to the apparatus used, reference is made to U.S. Pat. No. 4,019,866. The process described in WO 02/28941 is based on performing the early stages of increasing the molecular weight under conditions under which a second liquid phase would be formed or the polymer would precipitate out at the thermodynamic equilibrium. However, the reaction conditions are selected such that a phase separation occurs only with a significant delay and does not occur during the residence time of the reaction mixture in the reaction zone. To remove the residual water and to reduce the pressure, the reaction mixture from the prepolymerization is transferred into a flash apparatus. This is configured such that rapid solidification of the reaction mixture is avoided as a result of the removal of water. For this purpose, the apparatus has a large diameter at the start of the expansion, which is reduced to an increasing degree, as a result of which good control of the pressure reduction is enabled. The reaction mixture is discharged continuously into a stirred tank, from which steam is withdrawn overhead. The liquid polymer obtained is subjected to a further polymerization up to the desired molecular weight ($M_n$ of about 13 000 to 20 000).

U.S. Pat. No. 4,019,866 describes a process and an apparatus for continuous polyamide preparation. In the process, the polyamide-forming reactants are pumped continuously into a reaction zone designed to permit rapid heating and homogeneous mixing. The reactants are heated and mixed homogeneously within the reaction zone for a predetermined hold-up time and at an elevated temperature and elevated pressure to form a vapor and a prepolymer. The vapor formed is continuously separated from the prepolymers and the prepolymers are withdrawn from the reaction zone. The apparatus used is configured in the manner of a column and comprises a rectifying zone and a first and second reaction zone. In the first reaction zone a polyamide-forming salt solution is partly vaporized and partly converted, and in the second reaction zone the reaction is continued at a lower pressure than in the first reaction zone. The vapor from the first reaction zone is released through the rectifying zone.

EP 0123377 A2 describes a condensation process which serves, inter alia, for preparation of polyamides. In this process, a salt solution or a prepolymer is expanded in a flash reactor at a relative pressure (gauge pressure) of 0 to 27.6 bar. The residence time in the flash reactor is 0.1 to 20 seconds. In a specific implementation, a prepolymerization is first effected at a temperature of 191 to 232° C. and a solvent content (water content) of less than 25% by weight. The resulting salt solution is then brought to a relative pressure of 103.4 to 206.8 bar, and only then is the temperature increased to a value above the melting temperature and the solution expanded. The residence time in the flash reactor is less than 1 minute. The polymer can be fed into a twin-screw extruder and subjected there to a polymerization at a residence time of about 45 seconds to 7 minutes.

DE 4329676 A1 describes a process for continuous polycondensation of high molecular weight, especially amorphous, semiaromatic copolyamides, wherein a precondensate is first prepared from an aqueous reaction mixture while heating and at pressure at least 15 bar, then the temperature and pressure are increased to prepare a prepolymer and ultimately the copolyamide through condensation in a vented extruder. In the course of this, the water content is reduced as early as in the precondensation stage, and at the end of the precondensation is about 5 to 40% by weight. The prepolymer is then prepared at 220 to 350° C. and a pressure of at least 20 bar. The postpolymerization is then performed in a twin-screw extruder with venting zones.

EP 0976774 A2 describes a process for preparing polyamides, comprising the following steps:
i) polycondensing a dicarboxylic acid component comprising terephthalic acid, and a diamine component having a 1,9-nonanediamine and/or 2-methyl-1,8-octanediamine content of 60 to 100 mol % in the presence of 15 to 35% by weight of water at a reaction temperature of 250 to 280° C. and a reaction pressure which satisfies the following equation:

$$P_0 \geq P \geq 0.7 P_0$$

where $P_0$ is the saturation vapor pressure of water at the reaction temperature, to obtain a primary polycondensate,
(ii) discharging the primary polycondensate from step i) in an atmospheric environment with the same temperature range and at the same water content as in step i),
(iii) increasing the molecular weight by subjecting the discharge from step ii) to a solid state polymerization or a melt polymerization.

It is an object of the present invention to provide an improved process for preparing polyamides. More particularly, the transition from the oligomerization at lower temperatures in the presence of a high water content to the polymerization at higher temperatures in the presence of a low water content is to be effected under moderate conditions, especially at minimum pressures. The process is to lead to polyamides having the desired high molecular weight without any requirement for costly and inconvenient postpolymerization steps. The polyamides thus obtained are to feature advantageous product properties, more particularly not too broad a molecular weight distribution and/or a low gel content. Moreover, the typical disadvantages of a batchwise process, such as limitation of the batch size, loss of time resulting from filling, emptying and cleaning of the reaction vessel, etc. are also to be avoided.

It has been found that, surprisingly, this object is achieved by the process according to the invention, in which a starting mixture having a low water content is used for the oligomerization, the reaction mixture is subjected to at least one expansion to reduce the water content in the course of the polycondensation, and the final polymerization is effected at a temperature above the melting temperature of the aliphatic or semiaromatic polyamide.

SUMMARY OF THE INVENTION

The invention firstly provides a process for continuously preparing an aliphatic or semiaromatic polyamide, in which
a) an aqueous composition comprising at least one component which is suitable for polyamide formation and is selected from dicarboxylic acids, diamines, salts of at least one dicarboxylic acid and at least one diamine, lactams, ω-amino acids, aminocarbonitriles and mixtures thereof is provided, and the composition provided is supplied to an oligomerization zone,
b) in the oligomerization zone, the composition is subjected to an oligomerization at a temperature of 170 to 290° C. and an absolute pressure of at least 20 bar and a liquid output comprising the polyamide oligomers is withdrawn from the oligomerization zone,
c) the output from the oligomerization zone is optionally fed into a flash zone E1) and subjected to expansion to obtain a water-containing gas phase and a liquid phase comprising the polyamide oligomers, and at least a portion of the water-containing gas phase is removed,
d) the liquid output from the oligomerization zone or the liquid phase from the flash zone E1) is subjected to rapid heating to a temperature above the melting temperature $Tm_2$ of the aliphatic or semiaromatic polyamide, and
e) the heated composition from step d) is fed into a flash zone E2) and expanded to obtain a water-containing gas phase and a polyamide-containing liquid phase, at least a portion of the water-containing gas phase is removed and the polyamide-containing phase is subjected to a postpolymerization at a temperature above the melting temperature $Tm_2$ of the aliphatic or semiaromatic polyamide.

The invention further provides polyamide oligomers obtainable by a process as defined above and hereinafter.

The invention further provides a process for preparing a polyamide, in which a polyamide oligomer obtainable by a process as defined above and hereinafter is subjected to a further polymerization. The invention also provides the polyamides thus obtainable.

The invention further provides a polyamide molding composition comprising at least one polyamide, obtainable by a process as defined above and hereinafter. The invention further provides a molding produced from such a polyamide molding composition.

The invention further provides for the use of a semiaromatic polyamide obtainable by a process as defined above and hereinafter, preferably for production of electrical and electronic components and for high-temperature automotive applications.

The invention further provides for the use of an aliphatic polyamide obtainable by a process as defined above and hereinafter for production of films, monofilaments, fibers, yarns or textile fabrics.

Figure 1:
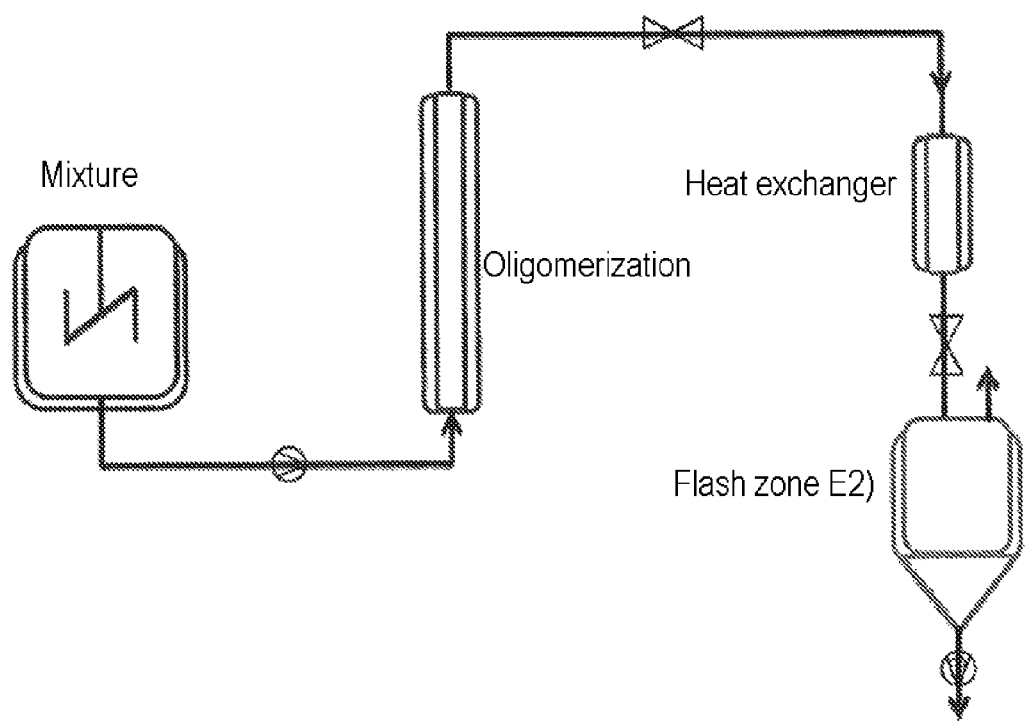
FIG. 1 shows a simple apparatus for performance of the process according to the invention, comprising
a mixing vessel for provision of the aqueous composition comprising at least one component suitable for polyamide formation (in the specific implementation, the aqueous composition is preferably provided in a mixing vessel and transferred into a reservoir vessel for continuous feeding), a tubular reactor as an oligomerization zone (in a departure from the specific implementation, other reactors can also be used for oligomerization, as described in detail hereinafter), a draw point from the oligomerization zone with an apparatus for pressure reduction, a heat exchanger for rapid heating of the reaction mixture, a flash tank E2) for separation of a water-containing gas phase and for postpolymerization of the reaction mixture, without forming a polyamide-containing solid phase.
Figure 2:
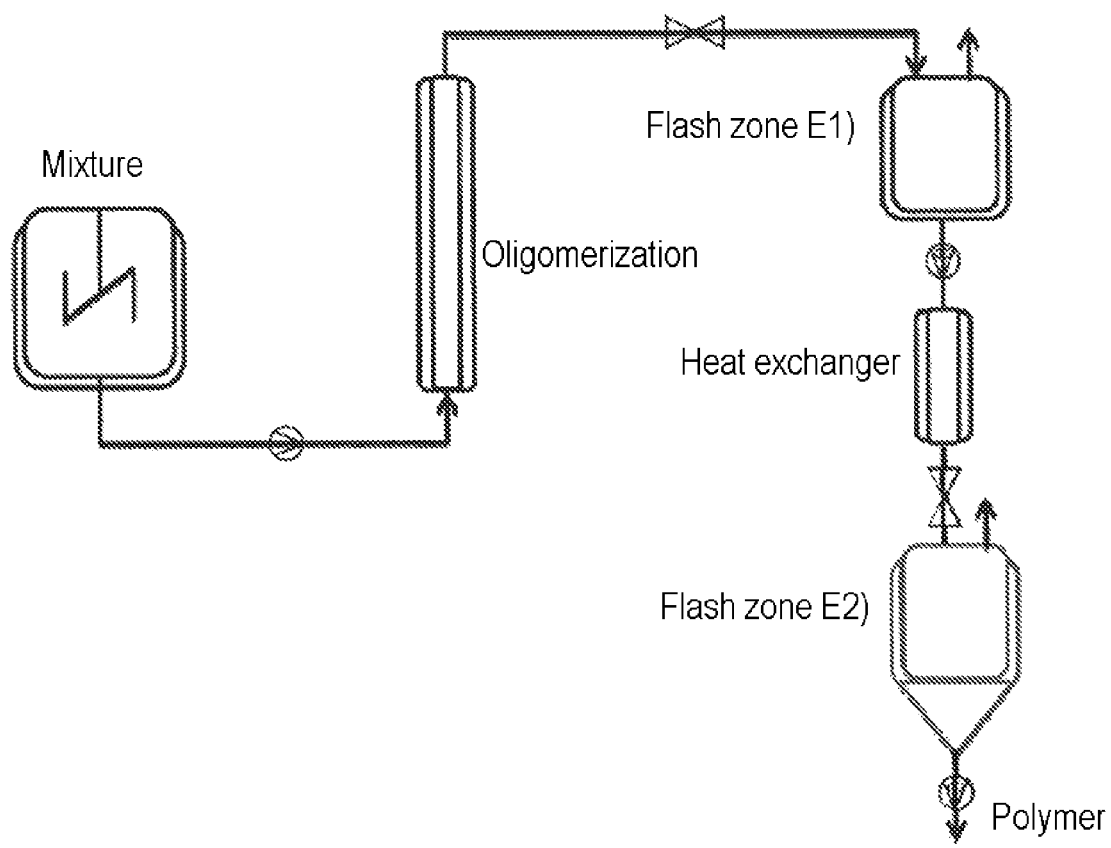
FIG. 2 shows a preferred embodiment of an apparatus for performance of the process according to the invention, comprising a mixing vessel for provision of the aqueous composition comprising at least one component suitable for polyamide formation (in the specific implementation, the aqueous composition is preferably provided in a mixing vessel and transferred into a reservoir vessel for continuous feeding), a tubular reactor as an oligomerization zone (in a departure from the specific implementation, other reactors can also be used for oligomerization, as described in detail hereinafter), a draw point from the oligomerization zone with an apparatus for pressure reduction, a flash tank E1) for separation of a water-containing gas phase without forming a polyamide-containing solid phase.

a heat exchanger for rapid heating of the reaction mixture, a flash tank E2) for separation of a water-containing gas phase and for postpolymerization of the reaction mixture, without forming a polyamide-containing solid phase.

DESCRIPTION OF THE INVENTION

The process according to the invention has the following advantages:

The process according to the invention enables the continuous preparation of polyamides, such that the typical disadvantages of a batchwise process, such as limitation of the batch size, loss of time resulting from filling, emptying and cleaning of the reaction vessel, etc. are avoided.

The process according to the invention enables the transition from the oligomerization at lower temperatures in the presence of a high water content to the polymerization at higher temperatures in the presence of a low water content at a moderate pressure.

The polymerization is effected in the process according to the invention in the melt with much shorter residence times than in comparable processes involving solid phase condensation. This also has an advantageous effect on the energy balance of the process and makes it more economically viable. In addition, the short residence time reduces or prevents side reactions and a deterioration in the properties of the polyamide obtained.

The glass transition temperatures (Tg), melting temperatures (Tm) and enthalpies of fusion (ΔH) described in the context of this application can be determined by means of differential scanning calorimetry (DSC). The DSC analysis on one and the same sample is appropriately repeated once or twice, in order to ensure a defined thermal history of the respective polyamide. In general, the values for the second analysis are reported, which is indicated by the index "2" in the measured values ($Tg_2$), ($Tm_2$), ($\Delta H_2$). The heating and cooling rates were each 20 K/min. $Tm_2$ is thus the melting temperature determined by means of DSC in degrees Celsius, measured on heating a sample of the polyamide which has been heated once before to the melting temperature.

The melting temperature $Tm_2$ of the aliphatic or semiaromatic polyamide in reaction steps d) and e) relates in both cases to the polyamide obtained as the end product of the reaction and not to any partly polymerized intermediate or the polymer in the reaction mixture present in each of reaction steps d) and e) (which may additionally comprise water, monomers, oligomers, etc.).

In the context of the invention, the terms "solid polymerization", "solid state polymerization, "solid condensation" and "solid state condensation" are used synonymously.

The condensation of the monomers of the acid component and of the diamine component, and also of any lactam component used, forms repeat units or end groups in the form of amides derived from the respective monomers. These monomers generally account for 95 mol %, especially 99 mol %, of all the repeat units and end groups present in the copolyamide. In addition, the copolyamide may also comprise small amounts of other repeat units which may result from degradation reactions or side reactions of the monomers, for example of the diamines.

The polyamides are designated in the context of the invention using abbreviations, some of which are customary in the art, which consist of the letters PA followed by numbers and letters. Some of these abbreviations are standardized in DIN EN ISO 1043-1. Polyamides which can be derived from aminocarboxylic acids of the $H_2N-(CH_2)_x-COOH$ type or the corresponding lactams are identified as PA Z where Z denotes the number of carbon atoms in the monomer. For example, PA 6 represents the polymer of ε-caprolactam or of ω-aminocaproic acid. Polyamides which derive from diamines and dicarboxylic acids of the $H_2N-(CH_2)_x-NH_2$ and $HOOC-(CH_2)_y-COOH$ types are identified as PA Z1Z2 where Z1 denotes the number of carbon atoms in the diamine and Z2 the number of carbon atoms in the dicarboxylic acid. Copolyamides are designated by listing the components in the sequence of their proportions, separated by slashes. For example, PA 66/610 is the copolyamide of hexamethylenediamine, adipic acid and sebacic acid. For the monomers having an aromatic or cycloaliphatic group which are used in accordance with the invention, the following letter abbreviations are used: T=terephthalic acid, I=isophthalic acid, MXDA=m-xylenediamine, IPDA=isophoronediamine, PACM=4,4'-methylenebis(cyclohexylamine), MACM=2,2'-dimethyl-4,4'-methylenebis(cyclohexylamine).

Hereinafter, the expression "$C_1$-$C_4$-alkyl" comprises unsubstituted straight-chain and branched $C_1$-$C_4$-alkyl groups. Examples of $C_1$-$C_4$-alkyl groups are especially methyl, ethyl, propyl, isopropyl, n-butyl, isobutyl, sec-butyl, tert-butyl(1,1-dimethylethyl).

In the aromatic dicarboxylic acids, aliphatic dicarboxylic acids, cycloaliphatic dicarboxylic acids and monocarboxylic acids mentioned hereinafter, the carboxyl groups may each be present in underivatized form or in the form of derivatives. In the case of dicarboxylic acids, neither carboxyl group, one carboxyl group or both carboxyl groups may be in the form of a derivative. Suitable derivatives are anhydrides, esters, acid chlorides, nitriles and isocyanates. Preferred derivatives are anhydrides or esters. Anhydrides of dicarboxylic acids may be in monomeric or in polymeric form. Preferred esters are alkyl esters and vinyl esters, more preferably $C_1$-$C_4$-alkyl esters, especially the methyl esters or ethyl esters. Dicarboxylic acids are preferably in the form of mono- or dialkyl esters, more preferably mono- or di-$C_1$-$C_4$-alkyl esters, more preferably monomethyl esters, dimethyl esters, monoethyl esters or diethyl esters. Dicarboxylic acids are additionally preferably in the form of mono- or divinyl esters. Dicarboxylic acids are additionally preferably in the form of mixed esters, more preferably mixed esters with different $C_1$-$C_4$-alkyl components, especially methyl ethyl esters.

Step a)

In step a) of the process according to the invention, an aqueous composition comprising at least one component suitable for polyamide formation is provided.

The components suitable for polyamide formation are preferably selected from
A) unsubstituted or substituted aromatic dicarboxylic acids and derivatives of unsubstituted or substituted aromatic dicarboxylic acids,
B) unsubstituted or substituted aromatic diamines,
C) aliphatic or cycloaliphatic dicarboxylic acids,
D) aliphatic or cycloaliphatic diamines,
E) monocarboxylic acids,
F) monoamines,
G) at least trifunctional amines,
H) lactams,
I) ω-amino acids,
K) compounds which are different than A) to I) and are cocondensable therewith.

A suitable embodiment is aliphatic polyamides. For aliphatic polyamides of the PA Z1 Z2 type (such as PA 66), the proviso applies that at least one of components C) and D) must be present and neither of components A) and B) may be present. For aliphatic polyamides of the PA Z type (such as PA 6 or PA 12), the proviso applies that at least component H) must be present.

A preferred embodiment is semiaromatic polyamides. For semiaromatic polyamides, the proviso applies that at least one of components A) and B) and at least one of components C) and D) must be present.

The aromatic dicarboxylic acids A) are preferably selected from in each case unsubstituted or substituted phthalic acid, terephthalic acid, isophthalic acid, naphthalenedicarboxylic acids or diphenyldicarboxylic acids, and the derivatives and mixtures of the aforementioned aromatic dicarboxylic acids.

Substituted aromatic dicarboxylic acids A) preferably have at least one (e.g. 1, 2, 3 or 4) $C_1$-$C_4$-alkyl radical. More particularly, substituted aromatic dicarboxylic acids A) have 1 or 2 $C_1$-$C_4$-alkyl radicals. These are preferably selected from methyl, ethyl, n-propyl, isopropyl, n-butyl, isobutyl, sec-butyl and tert-butyl, more preferably methyl, ethyl and n-butyl, particularly methyl and ethyl and especially methyl. Substituted aromatic dicarboxylic acids A) may also bear further functional groups which do not disrupt the amidation, for example 5-sulfoisophthalic acid, and salts and derivatives thereof. A preferred example thereof is the sodium salt of dimethyl 5-sulfoisophthalate.

Preferably, the aromatic dicarboxylic acid A) is selected from unsubstituted terephthalic acid, unsubstituted isophthalic acid, unsubstituted naphthalenedicarboxylic acids, 2-chloroterephthalic acid, 2-methylterephthalic acid, 5-methylisophthalic acid and 5-sulfoisophthalic acid.

More preferably, the aromatic dicarboxylic acid A) used is terephthalic acid, isophthalic acid or a mixture of terephthalic acid and isophthalic acid.

Preferably, the semiaromatic polyamides prepared by the process according to the invention (and the prepolymers provided in step a)) have a proportion of aromatic dicarboxylic acids among all the dicarboxylic acids of at least 50 mol %, more preferably of 70 mol % to 100 mol %. In a specific embodiment, the semiaromatic polyamides prepared by the process according to the invention (and the prepolymers provided in step a)) have a proportion of terephthalic acid or isophthalic acid or a mixture of terephthalic acid and isophthalic acid, based on all the dicarboxylic acids, of at least 50 mol %, preferably of 70 mol % to 100 mol %.

The aromatic diamines B) are preferably selected from bis(4-aminophenyl)methane, 3-methylbenzidine, 2,2-bis(4-am inophenyl)propane, 1,1-bis(4-am inophenyl)cyclohexane, 1,2-diaminobenzene, 1,4-diaminobenzene, 1,4-diaminonaphthalene, 1,5-diaminonaphthalene, 1,3-diaminotoluene(s), m-xylylenediamine, N,N'-dimethyl-4,4'-biphenyldiamine, bis(4-methylaminophenyl)methane, 2,2-bis(4-methylaminophenyl)-propane or mixtures thereof.

The aliphatic or cycloaliphatic dicarboxylic acids C) are preferably selected from oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, maleic acid, fumaric acid or itaconic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid and mixtures thereof.

The aliphatic or cycloaliphatic diamines D) are preferably selected from ethylene-diamine, propylenediamine, tetramethylenediamine, heptamethylenediamine, hexamethylenediamine, pentamethylenediamine, octamethylenediamine, nonamethylenediamine, 2-methyl-1,8-octamethylenediamine, decamethylenediamine, undecamethylenediamine, dodecamethylenediamine, 2-methylpentamethylenediamine, 2,2,4-trimethylhexamethylenediamine, 2,4,4-trimethylhexamethylenediamine, 5-methylnonamethylenediamine, 2,4-dimethyloctamethylenediamine, 5-methylnonane-diamine, bis(4-am inocyclohexyl)methane, 3,3'-dimethyl-4,4'-diaminodicyclohexylmethane and mixtures thereof.

More preferably, the diamine D) is selected from hexamethylenediamine, 2-methylpentamethylenediamine, octamethylenediamine, nonamethylenediamine, decamethylenediamine, undecamethylenediamine, dodecamethylenediamine, bis(4-aminocyclohexyl)methane, 3,3'-dimethyl-4,4'-diaminodicyclohexylmethane and mixtures thereof.

In a specific implementation, the semiaromatic polyamides comprise at least one copolymerized diamine D) selected from hexamethylenediamine, bis(4-aminocyclohexyl)methane (PACM), 3,3'-dimethyl-4,4'-diaminodicyclohexylmethane (MACM), isophoronediamine (IPDA) and mixtures thereof.

In a specific implementation, the semiaromatic polyamides comprise exclusively hexamethylenediamine as the copolymerized diamine D).

In a further specific implementation, the semiaromatic polyamides comprise exclusively bis(4-aminocyclohexyl)methane as the copolymerized diamine D).

In a further specific implementation, the semiaromatic polyamides comprise exclusively 3,3'-dimethyl-4,4'-diaminocyclohexylmethane (MACM) as the copolymerized diamine D).

In a further specific implementation, the semiaromatic polyamides comprise exclusively isophoronediamine (IPDA) as the copolymerized diamine D).

The aliphatic and the semiaromatic polyamides may comprise at least one copolymerized monocarboxylic acid E). The monocarboxylic acids E) serve to end-cap the polyamides prepared in accordance with the invention. Suitable monocarboxylic acids are in principle all of those capable of reacting with at least some of the amino groups available under the reaction conditions of the polyamide condensation. Suitable monocarboxylic acids E) are aliphatic monocarboxylic acids, alicyclic monocarboxylic acids and aromatic monocarboxylic acids. These include acetic acid, propionic acid, n-, iso- or tert-butyric acid, valeric acid, trimethylacetic acid, caproic acid, enanthic acid, caprylic acid, pelargonic acid, capric acid, undecanoic acid, lauric acid, tridecanoic acid, myristic acid, palmitic acid, stearic acid, pivalic acid, cyclohexanecarboxylic acid, benzoic acid, methylbenzoic acids, α-naphthalenecarboxylic acid, β-naphthalenecarboxylic acid, phenylacetic acid, oleic acid, ricinoleic acid, linoleic acid, linolenic acid, erucic acid, fatty acids from soya, linseeds, castor oil plants and sunflowers, acrylic acid, methacrylic acid, Versatic® acids, Koch® acids and mixtures thereof.

If the monocarboxylic acids E) used are unsaturated carboxylic acids or derivatives thereof, it may be advisable to work in the presence of commercial polymerization inhibitors.

More preferably, the monocarboxylic acid E) is selected from acetic acid, propionic acid, benzoic acid and mixtures thereof.

In a specific implementation, the aliphatic and the semiaromatic polyamides comprise exclusively propionic acid as the copolymerized monocarboxylic acid E).

In a further specific implementation, the aliphatic and the semiaromatic polyamides comprise exclusively benzoic acid as the copolymerized monocarboxylic acid E).

In a further specific implementation, the aliphatic and the semiaromatic polyamides comprise exclusively acetic acid as the copolymerized monocarboxylic acid E).

The aliphatic and the semiaromatic polyamides may comprise at least one copolymerized monoamine F). In this case, the aliphatic polyamides comprise only copolymerized aliphatic monoamines or alicyclic monoamines. The monoamines F) serve to end-cap the polyamides prepared in accordance with the invention. Suitable monoamines are in principle all of those capable of reacting with at least some of the carboxylic acid groups available under the reaction conditions of the polyamide condensation. Suitable monoamines F) are aliphatic monoamines, alicyclic monoamines and aromatic monoamines. These include methylamine, ethylamine, propylamine, butylamine, pentylamine, hexylamine, heptylamine, octylamine, decylamine, stearylamine, dimethylamine, diethylamine, dipropylamine, dibutylamine, cyclohexylamine, dicyclohexylamine, aniline, toluidine, diphenylamine, naphthylamine and mixtures thereof.

For preparation of the aliphatic and the semiaromatic polyamides, it is additionally possible to use at least one trifunctional amine G). These include N'-(6-aminohexyl)-hexane-1,6-diamine, N'-(12-aminododecyl)dodecane-1,12-diamine, N'-(6-aminohexyl)-dodecane-1,12-diamine, N'-[3-(aminomethyl)-3,5,5-trimethylcyclohexyl]hexane-1,6-diamine, N'-[3-(aminomethyl)-3,5,5-trimethylcyclohexyl]dodecane-1,12-diamine, N'-[(5-amino-1,3,3-trimethylcyclohexyl)methyl]hexane-1,6-diamine, N'-[(5-amino-1,3,3-trimethylcyclohexyl)methyl]dodecane-1,12-diamine, 3-[[[3-(aminomethyl)-3,5,5-trimethylcyclohexyl]amino]methyl]-3,5,5-trimethylcyclohexanamine, 3-[[(5-amino-1,3,3-trimethylcyclohexyl)methylamino]methyl]-3,5,5-trimethylcyclohexanamine, 3-(amino-methyl)-N-[3-(aminomethyl)-3,5,5-trimethylcyclohexyl]-3,5,5-trimethylcyclohexanamine. Preferably, no at least trifunctional amines G) are used.

Suitable lactams H) are ε-caprolactam, 2-piperidone (δ-valerolactam), 2-pyrrolidone (γ-butyrolactam), capryllactam, enantholactam, lauryllactam and mixtures thereof.

Suitable ω-amino acids I) are 6-aminocaproic acid, 7-aminoheptanoic acid, 11-aminovndecanoic acid, 12-aminododecanoic acid and mixtures thereof.

Suitable compounds K) which are different than A) to I) and are cocondensable therewith are at least tribasic carboxylic acids, diaminocarboxylic acids, etc.

Suitable compounds K) are additionally 4-[(Z)—N-(6-aminohexyl)-C-hydroxycarbonimidoyl]benzoic acid, 3-[(Z)—N-(6-aminohexyl)-C-hydroxycarbonimidoyl]benzoic acid, (6Z)-6-(6-aminohexylimino)-6-hydroxyhexanecarboxylic acid, 4-[(Z)—N-[(5-amino-1,3,3-trimethylcyclohexyl)methyl]-C-hydroxycarbonimidoyl]benzoic acid, 3-[(Z)—N-[(5-amino-1,3,3-trimethylcyclohexyl)methyl]-C-hydroxycarbonimidoyl]benzoic acid, 4-[(Z)—N-[3-(aminomethyl)-3,5,5-trimethylcyclohexyl]-C-hydroxycarbonimidoyl]benzoic acid, 3-[(Z)—N-[3-(aminomethyl)-3,5,5-trimethylcyclohexyl]-C-hydroxycarbonimidoyl]benzoic acid and mixtures thereof.

In a preferred embodiment, the process according to the invention serves for preparation of an aliphatic polyamide.

In that case, the polyamide is preferably selected from PA 4, PA 5, PA 6, PA 7, PA 8, PA 9, PA 10, PA 11, PA 12, PA 46, PA 66, PA 666, PA 69, PA 610, PA 612, PA 96, PA 99, PA 910, PA 912, PA 1212, and copolymers and mixtures thereof.

More particularly, the aliphatic polyamide is PA 6, PA 66 or PA 666, most preferably PA 6.

In a further preferred embodiment, the process according to the invention serves for preparation of a semiaromatic polyamide.

In that case, the polyamide is preferably selected from PA 6.T, PA 9.T, PA 8.T, PA 10.T, PA 12.T, PA 6.1, PA 8.1, PA 9.1, PA 10.1, PA 12.1, PA 6.T/6, PA 6.T/10, PA 6.I/12, PA 6.T/6.I, PA6.T/8.T, PA 6.T/9.T, PA 6.T/10T, PA 6.T/12.T, PA 12.T/6.T, PA 6.T/6.I/6, PA 6.T/6.I/12, PA 6.T/6.I/6.10, PA 6.T/6.I/6.12, PA 6.T/6.6, PA 6.T/6.10, PA 6.T/6.12, PA 10.T/6, PA 10.T/11, PA 10.T/12, PA 8.T/6.T, PA 8.T/66, PA 8.T/8.I, PA 8.T/8.6, PA 8.T/6.I, PA 10.T/6.T, PA 10.T/6.6, PA 10.T/10.I, PA 10T/10.I/6.T, PA 10.T/6.I, PA 4.T/4.I/46, PA 4.T/4.I/6.6, PA 5.T/5.I, PA 5.T/5.I/5.6, PA 5.T/5.I/6.6, PA 6.T/6.I/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/PACM.T, PA 6.T/MXDA.T, PA 6.T/6.I/8.T/8.I, PA 6.T/6.I/10.T/10.I, PA 6.T/6.I/IPDA.T/IPDA.I, PA 6.T/6.I/MXDA.T/MXDA.I, PA 6.T/6.I/MACM.T/MACM.I, PA 6.T/6.I/PACM.T/PACM.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof.

In that case, the polyamide is more preferably selected from PA 6.T, PA 9.T, PA 10.T, PA 12.T, PA 6.1, PA 9.1, PA 10.1, PA 12.1, PA 6.T/6.I, PA 6.T/6, PA6.T/8.T, PA 6.T/10T, PA 10.T/6.T, PA 6.T/12.T, PA12.T/6.T, PA IPDA.I, PA IPDA.T, PA 6.T/IPDA.T, PA 6.T/6.I/IPDA.T/IPDA.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof.

The aqueous composition which is provided in step a) and comprises at least one component suitable for polyamide formation can in principle be prepared by customary processes known to those skilled in the art. A suitable process for providing a salt solution for preparing semiaromatic polyamide oligomers is described, for example, in EP 0 693 515 A1.

The composition provided in step a) preferably has a water content of 20 to 55% by weight, more preferably of 25 to 50% by weight, based on the total weight of the composition.

In a specific embodiment, an aqueous solution comprising a salt of at least one diamine and at least one carboxylic acid is provided in step a). This solution preferably has a water content of 20 to 55% by weight, more preferably of 25 to 50% by weight, based on the total weight of the solution.

In addition to at least one component suitable for polyamide formation and water, the composition provided in step a) may comprise further components. These are preferably selected from catalysts, chain transfer agents, application-related additives and mixtures thereof. Suitable additives are flame retardants, inorganic and organic stabilizers, lubricants, dyes, nucleating agents, metallic pigments, metal flakes, metal-coated particles, antistats, conductivity additives, demolding agents, optical brighteners, defoamers, fillers and/or reinforcers, etc.

For the inventive preparation of the polyamide oligomers, it is possible to use at least one catalyst. Suitable catalysts are preferably selected from inorganic and/or organic phosphorus, tin or lead compounds, and mixtures thereof.

Examples of tin compounds suitable as catalysts include tin(II) oxide, tin(II) hydroxide, tin(II) salts of mono- or polybasic carboxylic acids, e.g. tin(II) dibenzoate, tin(II) di(2-ethylhexanoate), tin(II) oxalate, dibutyltin oxide, butyltin acid ($C_4H_9$—SnOOH), dibutyltin dilaurate, etc. Suitable lead compounds are, for example, lead(II) oxide, lead(II) hydroxide, lead(II) acetate, basic lead(II) acetate, lead(II) carbonate, etc.

Preferred catalysts are phosphorus compounds such as phosphoric acid, phosphorous acid, hypophosphorous acid, phenylphosphonic acid, phenylphosphinic acid and/or salts thereof with mono- to trivalent cations, for example Na, K, Mg, Ca, Zn or Al and/or esters thereof, for example triphenyl phosphate, triphenyl phosphite or tris(nonylphenyl) phosphite. Particularly preferred catalysts are hypophosphorous acid and salts thereof, such as sodium hypophosphite.

The catalysts are preferably used in an amount of 0.005 to 2.5% by weight, based on the total weight of the aqueous composition provided in step a).

Particular preference is given to using hypophosphorous acid and/or a salt of hypophosphorous acid in an amount of 50 to 1000 ppm, more preferably of 100 to 500 ppm, based on the total amount of the components suitable for polyamide formation (=components A) to K)).

The ring-opening lactam polymerization can be effected purely hydrolytically without use of a catalyst. In the case of activated anionic lactam polymerization, catalysts which enable the formation of lactam anions are used. Suitable catalysts and activators are known to those skilled in the art. The polycondensation of aminonitriles, for example the preparation of polyamide-6 from 6-aminocapronitrile (ACN), can be performed in the presence of a heterogeneous catalyst, such as $TiO_2$.

For control of the molar mass, it is possible to use at least one chain transfer agent. Suitable chain transfer agents are the monocarboxylic acids A) and monoamines F) mentioned above in the components suitable for polyamide formation. The chain transfer agent is preferably selected from acetic acid, propionic acid, butyric acid, valeric acid, caproic acid, lauric acid, stearic acid, 2-ethylhexanoic acid, cyclohexanoic acid, benzoic acid, 3-(3,5-di-tert-butyl-4-hydroxyphenyl)propanoic acid, 3,5-di-tert-butyl-4-hydroxybenzoic acid, 3-(3-tert-butyl-4-hydroxy-5-methylphenyl)propanoic acid, 2-(3,5-di-tert-butyl-4-hydroxybenzylthio)acetic acid, 3,3-bis(3-tert-butyl-4-hydroxyphenyl)butanoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, 2,2,6,6-tetramethylpiperidin-4-amine, 1,2,2,6,6-pentamethylpiperidin-4-amine, 4-amino-2,6-di-tert-butylphenol and mixtures thereof. It is also possible to use other monofunctional compounds which can react with an amino or acid group as the transfer agent, such as anhydrides, isocyanates, acid halides or esters. For control of the molecular weight, it is also possible to use a diamine component or a diacid component in a stoichiometric excess. A chain transfer agent of this kind is hexamethylenediamine. The chain transfer agent can be added to the aqueous composition provided in step a). The chain transfer agent can also be added to the output from the oligomerization zone withdrawn in step c) and/or to the polyamide oligomer prior to postpolymerization. The customary use amount of the chain transfer agents is within a range from 5 to 500 mmol per kg of polyamide oligomer, preferably 10 to 200 mmol per kg of polyamide oligomer.

If desired, further additives other than catalysts and chain transfer agents can be added to the aqueous composition provided in step a).

The additives which can specifically be added as early as in step a) include, for example, antioxidants, light stabilizers, customary processing aids, nucleating agents and crystallization accelerators. Fillers and reinforcers, in contrast, are preferably added before and/or during the final postpolymerization. For example, they can be added to the inventive polyamide oligomers in the course of postpolymerization in an extruder or kneader.

The aqueous composition can be prepared in step a) in a customary reaction apparatus, for example in a stirred tank. For continuous feeding into the oligomerization zone, the use of two or more than two reaction apparatuses may be advantageous. Thus, for example, in a suitable implementation, a batch can be provided in one reactor and an already finished composition can be fed continuously to the oligomerization zone from another reactor. In a further suitable implementation, the aqueous composition is provided in at least one reactor and then transferred into a reservoir vessel, from which the composition is then fed continuously to the oligomerization zone. The use of at least two reaction apparatuses can also be advantageous with regard to a cleaning, maintenance or a product change.

For preparation of the aqueous composition in step a), the components suitable for polyamide formation, the water and optionally one or more of the aforementioned further components are mixed with one another. Preference is given to mixing the components while heating.

Preferably, the aqueous composition is prepared in step a) under conditions under which there is essentially no oligomerization yet. Preferably, the content of unconverted components suitable for polyamide formation in the aqueous composition obtained in step a) is at least 95% by weight, more preferably at least 98% by weight, based on the total weight of the components suitable for polyamide formation.

Preferably, the temperature in the course of preparation of the aqueous composition in step a) is within a range from 80 to 170° C., more preferably from 100 to 165° C.

Preference is given to preparing the aqueous composition in step a) at ambient pressure or under elevated pressure. The pressure is preferably within a range from 0.9 to 50 bar, more preferably 1 bar to 10 bar. In a specific implementation, the aqueous composition is prepared in step a) at the autogenous pressure of the reaction mixture.

Preference is given to preparing the aqueous composition in step a) in an inert gas atmosphere. Suitable inert gases are, for example, nitrogen, helium or argon. In many cases, full inertization is not required; instead, merely purging of the reaction apparatus with an inert gas prior to heating of the components is sufficient.

In a suitable procedure for preparation of an aqueous solution comprising a salt of at least one diamine and at least one carboxylic acid, the diamine component is initially charged in the reaction apparatus dissolved in at least some of the water. Subsequently, the other components are added, preferably while stirring, and the water content is adjusted to the desired amount. The reaction mixture is heated while stirring until a clear homogeneous solution has formed. When heating, it should be taken into account that the salt formation in many cases is exothermic.

The aqueous composition obtained in step a) is preferably fed to the oligomerization zone essentially at the preparation temperature, i.e. without any intermediate cooling.

Step b)

For performance of the oligomerization in step b), the oligomerization zone may consist of one reactor or may comprise a plurality of (e.g. 2, 3, 4, etc.) identical or different reactors used. In the simplest case, the oligomerization zone is a single reactor. If a plurality of reactors are used, each of these may have identical or different temperatures and/or pressures. If a plurality of reactors are used, each of these may have identical or different mixing characteristics. The individual reactors may, if desired, be divided once or more than once by internals. Two or more reactors may be connected to one another as desired, for example in parallel or in series.

Suitable reaction apparatuses for the oligomerization are known to those skilled in the art. These include the generally customary reactors for liquid and gas-liquid reactions, for example tubular reactors, stirred tanks, etc., which may optionally be divided by internals.

In a suitable embodiment, the oligomerization zone used for the reaction in step b) comprises a cascade of at least two stirred tanks or consists of a cascade of at least two stirred tanks.

Preference is given to using at least one tubular reactor for the oligomerization in step b). A preferred configuration of a tubular reactor is the shell and tube reactor. In a preferred embodiment, the oligomerization zone used for the reaction in step b) thus comprises at least one tubular reactor or consists of at least one tubular reactor. When these reactors are used, products with a particularly low polydispersity (PD) can be obtained.

In a preferred implementation, the tubular reactors or tube bundle reactors used for the reaction in step b) are not backmixed. Thus, they preferably do not have any backmixing internals.

In a suitable configuration, the tubular reactors or tube bundle reactors used for the reaction in step b) may be operated substantially isothermally. For this purpose, heat transfer surfaces may suitably be disposed outside or within the reactors. Preferably, the heat transfer surfaces are present at least at the end of the tubular reactors or tube bundle reactors where the solution provided in step a) enters the oligomerization zone (inlet end). As already stated, the solution provided in step a) is introduced into the oligomerization zone under temperature control.

In a specific implementation of the process according to the invention, the oligomerization in step b) is effected without mass transfer with the environment. An "oligomerization without mass transfer with the environment" is understood to mean that, after the composition provided in step a) has been fed into the oligomerization zone, no mass transfer takes place between the oligomerization zone and the environment. More particularly, no gas stream is passed through the vessel during the oligomerization. Thus, during the oligomerization in step b), there is no introduction and also no discharge of components, for example of water, from the interior of the vessel into the environment, or vice versa. Exchange of heat between the interior of the vessel and the environment is, in contrast, permitted in the inventive oligomerization in step b). This embodiment is particularly advantageous, since it is thus possible to reduce or avoid the loss of volatile oligomers, for example of hexamethylenediamine.

In the reaction in step b), the reaction mixture may be monophasic or biphasic. The reaction mixture in the reaction in step b) is preferably monophasic. The monophasic reaction in step b) is effected in the liquid phase.

In the likewise possible biphasic reaction in step b), a liquid phase and a gaseous phase are present. The process according to the invention enables the oligomerization without formation of a solid phase. For this purpose, the temperature and pressure values used for the oligomerization are selected such that the reaction mixture is fully in liquid form or partly in the gaseous state.

In addition, in the biphasic configuration of the reaction in step b), the temperature and pressure values used for the oligomerization are selected such that essentially no proportions of the component used for polyamide formation are present in the gas phase. Thus, it has specifically been found that the performance of the oligomerization in step b) under the autogenous pressure of the system is particularly advantageous.

Accordingly, even when low-boiling components are used, such as hexamethylenediamine, essentially no proportions of the component used for polyamide formation are present in the gas phase.

The temperature in the oligomerization zone is preferably within a range from about 200 to 290° C., more preferably from 220 to 260° C., especially from 230 to 250° C.

If a plurality of reactors are used, these may have identical or different temperatures. Equally, a reactor may have a plurality of reaction regions which are operated at different temperatures. For example, a higher temperature can be set in a second reaction region of an individual reactor than in the first reaction region, or a higher temperature in the second reactor of a reactor cascade than in the first reactor, for example in order to achieve a maximum conversion and/or fewer side reactions.

The absolute pressure in the oligomerization zone is preferably within a range from 20 to 100 bar, more preferably within a range from 25 to 60 bar. In the case of use of a plurality of reactors, the reaction pressure in the individual reactors may be different.

Preferably, the residence time of the composition in the oligomerization zone in step b) is within a range from 10 minutes to 6 hours, more preferably from 20 minutes to 3 hours.

Preferably, the polyamide oligomers present in the output from the oligomerization zone have a maximum number-average molecular weight $M_n$, with the proviso that no solid phase forms (i.e. the polymer does not precipitate out). The molecular weight can be controlled, for example, via the water content, the temperature in the oligomerization zone and/or the residence time in the oligomerization zone. Preferably, the polyamide oligomers present in the output from the oligomerization zone have a number-average molecular weight $M_n$ of at least 500 g/mol, more preferably of at least 600 g/mol, especially of at least 700 g/mol. A suitable range for the number-average molecular weight $M_n$ is, for example, from 500 to 1500 g/mol.

Step c) (Optional Intermediate Expansion and Water Removal)

In a preferred embodiment of the process according to the invention, the output from the oligomerization zone is fed into a flash zone E1) and subjected to an expansion to obtain a water-containing gas phase and a liquid phase comprising the polyamide oligomers, and at least a portion of the water-containing gas phase is removed.

The expansion step c) can significantly reduce the water content in the reaction mixture without forming a solid phase. Such a reduced water content has an advantageous effect on the subsequent reaction steps. For instance, the energy requirement for the heating of the reaction mixture is reduced. The equilibrium of the polycondensation is shifted; the molecular weight of the polyamides in the reaction mixture rises. Not least, the thermal stress on the polymer is reduced and a lower level of unwanted by-products is formed.

Specifically, in step c), the product of the oligomerization is subjected to a partial expansion. A "partial expansion" is understood here to mean expansion to a pressure below the pressure in the oligomerization zone (or, if the oligomerization zone has a plurality of reactors, to a pressure below the pressure in the reactor from which the output is withdrawn), but above the ambient pressure.

For flash evaporation, the output from the oligomerization zone is fed into a flash zone E1) and a reduction in the pressure is undertaken therein, forming steam. The flash zone E1) may comprise one or more flash tanks. Suitable flash tanks generally comprise a pressure-resistant closed vessel, a feed apparatus for the polyamide from the oligomerization zone, a pressure-reducing apparatus, a withdrawal apparatus for the water-containing gas phase and a withdrawal apparatus for the liquid phase comprising polyamide oligomers. The expansion can be effected in one or more stages. In the case of multistage expansion, the output from the oligomerization zone is fed into a first flash tank and subjected therein to a first partial reduction of the pressure, the first water-containing gas phase formed is removed and the liquid phase is fed into a second flash tank and subjected therein to a second partial reduction of the pressure to form a second water-containing gas phase, which is in turn removed. If desired, further expansion stages may follow until the desired final pressure is attained. In the simplest case, the flash zone E1) is formed by a single flash tank. The flash tanks may be stirred or unstirred. In a specific implementation, the expansion apparatuses are heatable. Since the output from the oligomerization zone obtained by the process according to the invention generally does not have a very high viscosity, it is generally uncritical if the flash tank is unstirred.

The water phase obtained in step c) can be discharged from the system. For this purpose, the water phase obtained in step c) can optionally be combined at least partly with the water phase obtained in step e). In a suitable implementation of the process according to the invention, the water phase obtained in step c) is used at least partly for preparation of the aqueous composition in step a). Thus, the components suitable for polyamide formation present in the water phase obtained in step c) (such as hexamethylenediamine) can be recycled.

Preferably, no solid phase comprising polyamide oligomers is obtained in step c).

Preferably, the liquid phase which comprises polyamide oligomers and is obtained in step c) has a water content of 10 to 30% by weight, based on the total weight of the liquid phase. Specifically, the liquid phase which comprises polyamide oligomers and is obtained in step c) has a water content of at least 20% by weight, based on the total weight of the liquid phase.

Preferably, no solid phase forms in the case of a water content of at least 20% by weight in the liquid phase comprising polyamide oligomers; in other words, the polyamide oligomers do not precipitate out.

Preferably, the output from the oligomerization zone is expanded in step c) to an absolute pressure at least 5 bar, preferably at least 10 bar and especially at least 15 bar below the pressure in the oligomerization zone. If the oligomerization zone has a plurality of reactors which are operated at different pressures, the output from the oligomerization zone is expanded to an absolute pressure at least 5 bar, preferably at least 10 bar and especially at least 15 bar below the pressure in the reactor from which the output is withdrawn.

Preferably, the absolute pressure in the flash zone E1) in step c) is within a range from 10 to 50 bar, preferably from 20 to 35 bar.

The temperature in the flash zone in step c) may be lower, just as high as or higher than the temperature of the output from the oligomerization zone. Preferably, the temperature in the flash zone E1) differs by at most 30° C., more preferably by at most 20° C. and especially by at most 10° C. from the temperature of the output from the oligomerization zone.

Preferably, the temperature in the flash zone E1) in step c) is within a range from 170 to 290° C., more preferably from 200 to 290° C., especially from 210 to 270° C.

Preferably, the residence time of the liquid phase comprising the polyamide oligomers in the flash zone E1) is within a range from 1 minute to 1 hour, more preferably from 5 minutes to 30 minutes. This treatment of the partly dewatered polyamide oligomers in the flash zone E1) further increases the molecular weight of the polyamide oligomers, also as a result of the shift in the equilibrium of the polycondensation reaction because of the prior partial dewatering.

In a preferred embodiment, the temperature and the pressure in the flash zone E1) are essentially unchanged during the aftertreatment of the liquid phase.

The polyamide oligomers present in the output from the flash zone E1) in step c) preferably have a number-average molecular weight $M_n$ of at least 650 g/mol, more preferably of at least 800 g/mol. Preferably, they have a maximum number-average molecular weight $M_n$, with the proviso that no solid phase forms (i.e. the polymer does not precipitate out). The molecular weight can be controlled, for example, via the water content, the temperature in the oligomerization zone and/or the residence time in the flash zone E1). In a specific embodiment of step c) with aftertreatment of the liquid phase in the flash zone E1), the polyamide oligomers present in the output from the flash zone E1) have a number-average molecular weight $M_n$ of up to 2500 g/mol, more preferably of up to 4500 g/mol.

The polyamide oligomers present in the output from the flash zone E1) preferably have a polydispersity PD of not more than 4.5.

Step d) (Rapid Heating)

In step d) of the process according to the invention, the liquid output from the oligomerization zone or (if the liquid output from the oligomerization zone is subjected to an expansion in step c) the liquid phase from the flash zone E1) is subjected to rapid heating to a temperature above the melting temperature $Tm_2$ of the aliphatic or semiaromatic polyamide.

If the output from the oligomerization zone is not subjected to an expansion in step c), the pressure can be reduced before the rapid heating in step d). This reduction in the pressure can be performed with an apparatus customary therefor. This includes the use of at least one pressure-reducing valve. Preferably, the pressure of the output from the oligomerization zone is reduced to an absolute pressure at least 5 bar, preferably at least 10 bar, below the pressure in the oligomerization zone. The reduction in the pressure prior to the rapid heating in step d) is effected specifically with the proviso that no solid phase comprising polyamide oligomers is obtained.

For the heating in step d), an apparatus customary for this purpose can be used. This includes heat exchangers, mixer/heat exchangers, plate heaters, heaters based on electromagnetic radiation. Preference is given to heating in step d) using a shell and tube heat exchanger. Suitable heat transferers are steam or a heat carrier oil.

In a specific execution, heating in step d) may be accomplished using a coiled tube evaporator (also known as coiled tube heat exchanger or heated coiled tubes). Coiled tube evaporators are known in the prior art, for example from DE 19827852A1. What is advantageous about coiled tube evaporators is that, when they are pressurized at the inlet, there is a decrease in pressure in flow direction in the coiled tube evaporators. The more volume is made available to a pressurized medium for expansion, the greater the magnitude of this decrease in pressure. The volume made available in a coiled tube evaporator depends on the geometric dimensions of the coiled tube evaporator, for example the tube length and/or the internal tube diameter. As a result of the decrease in pressure, a lower pressure compared to the inlet of the coiled tube evaporator is thus present at the outlet of the coiled tube evaporator. If, for example, the output from the oligomerization zone is fed to a coiled tube evaporator having been super-heated under pressure, i.e. at a temperature above the boiling temperature of the output, volatile constituents of the output can evaporate out of the oligomerization zone even downstream of the inlet of the coiled tube evaporator. The vapor formed promotes the transport of the composition which becomes increasingly viscous in flow direction and additionally ensures that the heat transfer area is kept clear. It is generally the case that the residence time in the coiled tube evaporator can be controlled via the flowrate and especially via the geometric dimensions, for example the tube length and/or internal tube diameter, of the coiled tube evaporator. More preferably, according to the desired mode of operation, it is possible to decompress a composition in a coiled tube evaporator to an absolute pressure in the region of less than 4 bar.

Preferably, heating in step d) is effected to a temperature above the melting temperature $Tm_2$ of the aliphatic or semiaromatic polyamide within not more than 30 minutes, preferably within not more than 15 minutes, particularly within not more than 5 minutes and especially within not more than 2 minutes. Specifically, this heating operation is sufficiently rapid that no solid phase comprising polyamide oligomers is obtained.

Preferably, the liquid output from the oligomerization zone or the liquid phase from the flash zone E1) in step d) is heated to a temperature at least 5° C., preferably at least 10° C., above the melting temperature $Tm_2$ of the aliphatic or semiaromatic polyamide. Specifically, the liquid output from the oligomerization zone or the liquid phase from the flash zone E1) in step d) is heated to a temperature of at least 310° C., preferably of at least 320° C.

Preferably, the rapid heating in step d) is effected with an apparatus selected from heat exchangers, especially mixer/heat exchangers, plate heat exchangers, spiral heat exchangers, coiled tube heat exchangers, tube/tube bundle heat exchangers, U-tube heat exchangers, shell and tube heat exchangers, heating registers, stacked heat exchangers, plate heaters, heaters based on electromagnetic radiation and combinations thereof.

Preferably, the absolute pressure of the heated reaction mixture is reduced in step d) to a pressure of less than 35 bar, preferably of less than 20 bar, more preferably of less than 10 bar, most preferably of less than 4 bar.

During or after the heating in step d), a biphasic reaction mixture consisting of a gaseous phase and a liquid phase is generally obtained. Specifically, the reaction mixture obtained after the heating in step d) does not include a solid phase comprising polyamide oligomers.

Step e) (Expansion and Postpolymerization in the Flash Zone E2)

In step e) of the process according to the invention, the heated composition from step d) is fed into a flash zone E2) and subjected to an expansion to obtain a water-containing gas phase and a polyamide-containing liquid phase. At least a portion of the water-containing gas phase is removed and the polyamide-containing phase is subjected to a postpolymerization. This postpolymerization is specifically effected in the manner of a melt polymerization and not in the manner of a solid state polymerization. Specifically, the temperature in the flash zone E2) is thus above the melting temperature $Tm_2$ of the aliphatic or semiaromatic polyamide.

The flash zone E2) may comprise one or more expansion apparatuses. Preferably, the expansion apparatuses are selected from unstirred and stirred flash tanks, extruders, kneaders, strand devolatilizers, other apparatuses having kneading and/or conveying elements or a combination of at least two of these apparatuses. In a specific implementation, the expansion apparatuses are heatable.

In a specific embodiment, the flash zone E2) comprises a vented extruder or consists of a vented extruder. Vented extruders for devolatilization of a polymer material are known in principle to those skilled in the art and are described, for example, in EP 0 490 359 A1 and WO 2009/040189. Known vented extruders are typically constructed in such a way that the material stream to be devolatilized is generally supplied to the extruder screw(s) on the drive side in a feed zone and the extrudate is degassed and conveyed toward the screw tip. In the course of this, passage through one or more zones of elevated pressure in the extruder is typically followed by a downstream depressurization of the material, in which devolatilization is effected. The devolatilization can be effected at a superatmospheric pressure reduced compared to the feed zone, at atmospheric pressure or with the aid of vacuum. If desired, the temperature can be increased downstream of the feed zone.

In a further specific embodiment, the flash zone E2) comprises a kneader or consists of a kneader.

In a further specific embodiment, the flash zone E2) comprises a strand devolatilizer or consists of a strand devolatilizer. The term "strand devolatilizer" typically refers to an essentially upright vessel with an entry orifice for the free-flowing reaction mixture at the upper end and an exit orifice at the lower end. Preferably, the free-flowing composition heated in step d) to a temperature above the melting temperature $Tm_2$ is conducted through a die plate or perforated plate at the inlet end of the strand devolatilizer. This forms one or more component strands of the composition. These are then conveyed through the strand devolatilizer, preferably though the effect of gravity alone.

In a further specific embodiment, the flash zone E2) comprises an unstirred or stirred flash tank or consists of an unstirred or stirred flash tank. The flash zone E2) may comprise one or more flash tanks. Suitable flash tanks generally comprise a pressure-resistant closed vessel, a feed apparatus for the heated polyamide composition from step d), a pressure-reducing apparatus, a withdrawal apparatus for the water-containing gas phase and a withdrawal apparatus for the polyamides. Suitable flash tanks are, for example, unstirred or stirred tanks, conical tanks, etc.

The expansion in step e) can be effected in one or more stages. In the multistage expansion, the output from the oligomerization zone is fed into a first flash tank and subjected therein to a first partial reduction of the pressure, the first water-containing gas phase formed is removed and the liquid phase is fed into a second flash tank and subjected therein to a second partial reduction of the pressure to form a second water-containing gas phase, which is in turn removed. If desired, further expansion stages may follow until the desired final pressure is attained. In the simplest case, the flash zone E2) is formed by a single flash tank. Since the polyamides obtained by the process according to the invention have a molecular weight sufficient for end uses and a correspondingly high viscosity, it may be advantageous when flash tank E2) is stirred.

The discharge of the polyamides from the flash zone E2) or the conveying from one expansion apparatus into another expansion apparatus can be effected, for example, by means of melt pumps. Suitable melt pumps are obtainable, for example, from GALA Kunststoff- and Kautschukmaschinen GmbH, 46509 Xanten, Germany; Gneuss Kunststofftechnik GmbH, 32549 Bad Oeynhausen, Germany or Kreyenborg GmbH, 48157 Münster, Germany. In a specific implementation, a gear pump is used. Gear pumps are displacement pumps with high metering accuracy and good pressure buildup capacity. They are obtainable, for example, from Kreyenborg GmbH, 48157 Münster, Germany.

The water phase obtained in step e) can be discharged from the system. For this purpose, the water phase obtained in step e) can optionally be combined at least partly with the water phase obtained in step c). In a suitable implementation of the process according to the invention, the water phase obtained in step e) is used at least partly for preparation of the aqueous composition in step a). Thus, components suitable for polyamide formation present in the water phase obtained in step e) (such as hexamethylenediamine) can be recycled.

Preferably, the absolute pressure in the flash zone E2) in step e) is within a range from 1.5 to 15 bar, preferably from 2 to 12 bar. The pressure in the flash zone E2) can be used to control the target value for the molecular weight of the aliphatic or semiaromatic polyamide. In order to achieve maximum molecular weights, a minimum absolute pressure in the flash zone E2) (and hence a relatively low water content) is advantageous. In a specific implementation, the absolute pressure in the flash zone E2) in step e) is not more than 10 bar, more specifically not more than 7 bar.

As stated above, the temperature in the flash zone E2) in step e) is above the melting temperature $Tm_2$ of the aliphatic or semiaromatic polyamide. Preferably, the temperature in the flash zone E2) in step e) is at least 5° C., preferably at least 10° C., above the melting temperature $Tm_2$ of the aliphatic or semiaromatic polyamide. Preferably, the temperature in the flash zone E2) in step e) is at least 300° C., more preferably at least 310° C. The temperature in the flash zone E2) is selected here as a function of the melting temperature of the polymer.

Preferably, the residence time in the flash zone E2) for aliphatic polyamides in step e) is 1 minute to 60 minutes.

Preferably, the residence time in the flash zone E2) for semiaromatic polyamides in step e) is 30 seconds to 15 minutes.

The inventive aliphatic polyamides, and those obtained by the process according to the invention, preferably have a number-average molecular weight $M_n$ within a range from 13 000 to 28 000 g/mol.

The inventive semiaromatic polyamides, and those obtained by the process according to the invention, preferably have a number-average molecular weight $M_n$ within a range from 13 000 to 25 000 g/mol, more preferably from 15 000 to 20 000 g/mol.

The inventive aliphatic polyamides, and those obtained by the process according to the invention, preferably have a weight-average molecular weight $M_n$ within a range from 20 000 to 140 000 g/mol.

The inventive semiaromatic polyamides, and those obtained by the process according to the invention, preferably have a weight-average molecular weight $M_n$ within a range from 25 000 to 125 000 g/mol.

The inventive aliphatic and semiaromatic polyamides, and those obtained by the process according to the invention, preferably have a polydispersity PD ($=M_w/M_n$) of not more than 5, more preferably of not more than 3.5.

The output from the flash zone E2) can subsequently be subjected to a further processing operation, preferably selected from pelletization, devolatilization, postpolymerization and a combination of at least two of these measures. For this purpose, the output from the flash zone E2) can be fed, for example, to an extruder. In the extruder, the polyamides can be devolatilized and/or postpolymerized. In addition, the extruder can also be used for compounding of the polyamides. For this purpose, additives such as customary fillers and reinforcers can be fed in via one or more intakes. In an advantageous configuration, the output from the flash zone E2) already has a profile of properties suitable for end uses.

The aliphatic polyamides obtainable by the process according to the invention are especially suitable for production of films, monofilaments, fibers, yarns or textile fabrics. In this context, the aliphatic polyamides prepared in accordance with the invention are generally found to be particularly stable to processing during a melt extrusion through slot dies or annular dies to form flat or blown films, and through annular dies of smaller diameter to form monofilaments.

The semiaromatic polyamides obtainable by the process according to the invention likewise have advantageous properties.

The inventive semiaromatic polyamide, and that obtained by the process according to the invention, preferably has a gel content not exceeding 5% by weight, based on the total weight of the polyamide.

The semiaromatic polyamide, and that obtained by the process according to the invention, preferably has a viscosity number of 80 to 120 ml/g. The viscosity number (Staudinger function, referred to as VN or J) is defined as $VN=1/c \times (\eta-\eta_s)/\eta_s$. The viscosity number is directly related to the mean molar mass of the polyamide and gives information about the processibility of a polymer. The viscosity number can be determined to EN ISO 307 with an Ubbelohde viscometer.

The present invention further relates to moldings (or molded parts) consisting at least partly of a polyamide molding composition produced using a polyamide as specified above.

Polyamide Molding Composition

The invention further provides a polyamide molding composition comprising at least one inventive semiaromatic copolyamide.

Preference is given to a polyamide molding composition comprising:
A) 25 to 100% by weight of at least one semiaromatic copolyamide, as defined above,
B) 0 to 75% by weight of at least one filler and reinforcer,
C) 0 to 50% by weight of at least one additive,
where components A) to C) together add up to 100% by weight.

The term "filler and reinforcer" (=component B) is understood in a broad sense in the context of the invention and comprises particulate fillers, fibrous substances and any intermediate forms. Particulate fillers may have a wide range of particle sizes ranging from particles in the form of dusts to large grains. Useful filler materials include organic or inorganic fillers and reinforcers. For example, it is possible to use inorganic fillers, such as kaolin, chalk, wollastonite, talc, calcium carbonate, silicates, titanium dioxide, zinc oxide, graphite, glass particles, e.g. glass beads, nanoscale fillers, such as carbon nanotubes, carbon black, nanoscale sheet silicates, nanoscale alumina ($Al_2O_3$), nanoscale titania ($TiO_2$), graphene, permanently magnetic or magnetizable metal compounds and/or alloys, sheet silicates and nanoscale silica ($SiO_2$). The fillers may also have been surface treated.

Examples of sheet silicates used in the inventive molding compositions include kaolins, serpentines, talc, mica, vermiculites, illites, smectites, montmorillonite, hectorite, double hydroxides or mixtures thereof. The sheet silicates may have been surface treated or may be untreated.

In addition, it is possible to use one or more fibrous substances. These are preferably selected from known inorganic reinforcing fibers, such as boron fibers, glass fibers, carbon fibers, silica fibers, ceramic fibers and basalt fibers; organic reinforcing fibers, such as Aramid fibers, polyester fibers, nylon fibers, polyethylene fibers and natural fibers, such as wood fibers, flax fibers, hemp fibers and sisal fibers.

It is especially preferable to use glass fibers, carbon fibers, Aramid fibers, boron fibers, metal fibers or potassium titanate fibers.

Specifically, chopped glass fibers are used. More particularly, component B) comprises glass fibers and/or carbon fibers, preference being given to using short fibers. These preferably have a length in the range from 2 to 50 mm and a diameter of 5 to 40 µm. Alternatively, it is possible to use continuous fibers (rovings). Suitable fibers are those having a circular and/or noncircular cross-sectional area, in which latter case the ratio of dimensions of the main cross-sectional axis to the secondary cross-sectional axis is >2, preferably in the range from 2 to 8 and more preferably in the range from 3 to 5.

In a specific implementation, component B) comprises what are called "flat glass fibers". These specifically have a cross-sectional area which is oval or elliptical or elliptical and provided with indentation(s) (called "cocoon" fibers), or rectangular or virtually rectangular. Preference is given here to using glass fibers with a noncircular cross-sectional area and a ratio of dimensions of the main cross-sectional axis to the secondary cross-sectional axis of more than 2, preferably of 2 to 8, especially of 3 to 5.

For reinforcement of the inventive molding compositions, it is also possible to use mixtures of glass fibers having circular and noncircular cross sections. In a specific implementation, the proportion of flat glass fibers, as defined above, predominates, meaning that they account for more than 50% by weight of the total mass of the fibers.

If rovings of glass fibers are used as component B), these preferably have a diameter of 10 to 20 µm, preferably of 12 to 18 µm. In this case, the cross section of the glass fibers may be round, oval, elliptical, virtually rectangular or rectangular. Particular preference is given to what are called flat glass fibers having a ratio of the cross-sectional axes of 2 to 5. More particularly, E glass fibers are used. However, it is also possible to use all other glass fiber types, for example A, C, D, M, S or R glass fibers or any desired mixtures thereof, or mixtures with E glass fibers.

The inventive polyamide molding compositions can be produced by the known processes for producing long fiber-reinforced rod pellets, especially by pultrusion processes, in which the continuous fiber strand (roving) is fully saturated with the polymer melt and then cooled and cut. The long fiber-reinforced rod pellets obtained in this manner, which preferably have a pellet length of 3 to 25 mm, especially of 4 to 12 mm, can be processed by the customary processing methods, for example injection molding or press molding, to give moldings.

The inventive polyamide molding composition comprises preferably 25 to 75% by weight, more preferably 33 to 60% by weight, of at least one filler or reinforcer B), based on the total weight of the polyamide molding composition.

Suitable additives C) are heat stabilizers, flame retardants, light stabilizers (UV stabilizers, UV absorbers or UV blockers), lubricants, dyes, nucleating agents, metallic pigments, metal flakes, metal-coated particles, antistats, conductivity additives, demolding agents, optical brighteners, defoamers, etc.

As component C), the inventive molding compositions comprise preferably 0.01 to 3% by weight, more preferably 0.02 to 2% by weight and especially 0.1 to 1.5% by weight of at least one heat stabilizer.

The heat stabilizers are preferably selected from copper compounds, secondary aromatic amines, sterically hindered phenols, phosphites, phosphonites and mixtures thereof.

If a copper compound is used, the amount of copper is preferably 0.003 to 0.5%, especially 0.005 to 0.3% and more preferably 0.01 to 0.2% by weight, based on the sum of components A) to C).

If stabilizers based on secondary amines are used, the amount of these stabilizers is preferably 0.2 to 2% by weight, more preferably from 0.2 to 1.5% by weight, based on the sum of components A) to C).

If stabilizers based on sterically hindered phenols are used, the amount of these stabilizers is preferably 0.1 to 1.5% by weight, more preferably from 0.2 to 1% by weight, based on the sum of components A) to C).

If stabilizers based on phosphites and/or phosphonites are used, the amount of these stabilizers is preferably 0.1 to 1.5% by weight, more preferably from 0.2 to 1% by weight, based on the sum of components A) to C).

Compounds of mono- or divalent copper are, for example, salts of mono- or divalent copper with inorganic or organic acids or mono- or dihydric phenols, the oxides of mono- or divalent copper or the complexes of copper salts with ammonia, amines, amides, lactams, cyanides or phosphines, preferably Cu(I) or Cu(II) salts of the hydrohalic acids or of the hydrocyanic acids or the copper salts of the aliphatic carboxylic acids. Particular preference is given to the monovalent copper compounds CuCl, CuBr, CuI, CuCN and Cu$_2$O, and to the divalent copper compounds CuCl$_2$, CuSO$_4$, CuO, copper(II) acetate or copper(II) stearate.

The copper compounds are commercially available, or the preparation thereof is known to those skilled in the art. The copper compound can be used as such or in the form of concentrates. A concentrate is understood to mean a polymer, preferably of the same chemical nature as component A), which comprises the copper salt in high concentration. The use of concentrates is a standard method and is employed particularly frequently when very small amounts of a feedstock have to be metered in. Advantageously, the copper compounds are used in combination with further metal halides, especially alkali metal halides, such as NaI, KI, NaBr, KBr, in which case the molar ratio of metal halide to copper halide is 0.5 to 20, preferably 1 to 10 and more preferably 3 to 7.

Particularly preferred examples of stabilizers which are based on secondary aromatic amines and are usable in accordance with the invention are adducts of phenylenediamine with acetone (Naugard® A), adducts of phenylenediamine with linolenic acid, 4,4'-bis (α,α-dimethylbenzyl) diphenylamine (Naugard® 445), N,N'-dinaphthyl-p-phenylenediamine, N-phenyl-N'-cyclohexyl-p-phenylenediamine or mixtures of two or more thereof.

Particularly preferred examples of stabilizers which are based on sterically hindered phenols and are usable in accordance with the invention are N,N'-hexamethylenebis-3-(3,5-di-tert-butyl-4-hydroxyphenyl)propionamide, bis(3, 3-bis(4'-hydroxy-3'-tert-butylphenyl)butanoic acid)glycol ester, 2,1'-thioethyl bis(3-(3,5-di-tert-butyl-4-hydroxy-phenyl)propionate, 4,4'-butylidenebis(3-methyl-6-tert-butyl-phenol), triethylene glycol 3-(3-tert-butyl-4-hydroxy-5-methylphenyl)propionate or mixtures of two or more of these stabilizers.

Preferred phosphites and phosphonites are triphenyl phosphite, diphenyl alkyl phosphite, phenyl dialkyl phosphite, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythrityl diphosphite, bis(2,4-di-tert-butylphenyl)pentaerythrityl diphosphite, bis(2,6-di-tert-butyl-4-methylphenyl)pentaerythrityl diphosphite, diisodecyloxy pentaerythrityl diphosphite, bis(2,4-di-tert-butyl-6-methylphenyl)pentaerythrityl diphosphite, bis(2,4,6-tris(tert-butylphenyl)) pentaerythrityl diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyldibenzo[d,g]-1,3,2-dioxaphosphocin, bis(2,4-di-tert-butyl-6-methylphenyl) methyl phosphite and bis(2,4-di-tert-butyl-6-methylphenyl) ethyl phosphite. More particularly, preference is given to tris[2-tert-butyl-4-thio(2'-methyl-4'-hydroxy-5'-tert-butyl) phenyl-5-methyl]phenyl phosphite and tris(2,4-di-tert-butylphenyl) phosphite (Hostanox® PAR24: commercial product from BASF SE).

A preferred embodiment of the heat stabilizer consists in the combination of organic heat stabilizers (especially Hostanox PAR 24 and Irganox 1010), a bisphenol A-based epoxide (especially Epikote 1001) and copper stabilization based on CuI and KI. An example of a commercially available stabilizer mixture consisting of organic stabilizers and epoxides is Irgatec NC66 from BASF SE. More particularly, preference is given to heat stabilization exclusively based on CuI and KI. Aside from the addition of copper or copper compounds, the use of further transition metal compounds, especially metal salts or metal oxides of group VB, VIB, VIIB or VIIIB of the Periodic Table, is ruled out. In addition, it is preferable not to add any transition metals of group VB, VIB, VIIB or VIIIB of the Periodic Table, for example iron powder or steel powder, to the inventive molding composition.

The inventive molding compositions comprise preferably 0 to 30% by weight, more preferably 0 to 20% by weight, based on the total weight of components A) to C), of at least one flame retardant as additive C). When the inventive molding compositions comprise at least one flame retardant, they preferably do so in an amount of 0.01 to 30% by weight, more preferably of 0.1 to 20% by weight, based on the total weight of components A) to C). Useful flame retardants C) include halogenated and halogen-free flame retardants and synergists thereof (see also Gächter/Müller, 3rd edition 1989 Hanser Verlag, chapter 11). Preferred halogen-free flame retardants are red phosphorus, phosphinic or diphosphinic salts and/or nitrogen-containing flame retardants such as melamine, melamine cyanurate, melamine sulfate, melamine borate, melamine oxalate, melamine phosphate (primary, secondary) or secondary melamine pyrophosphate, neopentyl glycol boric acid melamine, guanidine and derivatives thereof known to those skilled in the art, and also polymeric melamine phosphate (CAS No.: 56386-64-2 or 218768-84-4, and also EP 1095030), ammonium polyphosphate, trishydroxyethyl isocyanurate (optionally also ammonium polyphosphate in a mixture with trishydroxyethyl isocyanurate) (EP584567). Further N-containing or P-containing flame retardants, or PN condensates suitable as flame retardants, can be found in DE 10 2004 049 342, as can the synergists likewise customary for this purpose, such as oxides or borates. Suitable halogenated flame retardants are, for example, oligomeric brominated polycarbonates (BC 52 Great Lakes) or polypentabromobenzyl acrylates with N greater than 4 (FR 1025 Dead sea bromine), reaction products of tetrabromobisphenol A with epoxides, brominated oligomeric or polymeric styrenes, Dechlorane, which are usually used with antimony oxides as synergists (for details and further flame retardants see DE-A-10 2004 050 025).

The antistats used in the inventive molding compositions may, for example, be carbon black and/or carbon nanotubes. The use of carbon black may also serve to improve the black color of the molding composition. However, the molding composition may also be free of metallic pigments.

Molding

The present invention further relates to moldings which are produced using the inventive copolyamides or polyamide molding compositions.

The inventive semiaromatic polyamides are advantageously suitable for use for production of moldings for electrical and electronic components and for high-temperature automotive applications.

A specific embodiment is moldings in the form of or as part of a component for the automotive sector, especially selected from cylinder head covers, engine hoods, housings for charge air coolers, charge air cooler valves, intake pipes, intake manifolds, connectors, gears, fan impellers, cooling water tanks, housings or housing parts for heat exchangers, coolant coolers, charge air coolers, thermostats, water pumps, heating elements, securing parts.

A further specific embodiment is moldings as or as part of an electrical or electronic passive or active component of a printed circuit board, of part of a printed circuit board, of a housing constituent, of a film, or of a wire, more particularly in the form of or as part of a switch, of a plug, of a bushing, of a distributor, of a relay, of a resistor, of a capacitor, of a winding or of a winding body, of a lamp, of a diode, of an LED, of a transistor, of a connector, of a regulator, of an integrated circuit (IC), of a processor, of a controller, of a memory element and/or of a sensor.

The inventive semiaromatic polyamides are additionally specifically suitable for use in soldering operations under lead-free conditions (lead free soldering), for production of plug connectors, microswitches, microbuttons and semiconductor components, especially reflector housings of light-emitting diodes (LEDs).

A specific embodiment is that of moldings as securing elements for electrical or electronic components, such as spacers, bolts, fillets, push-in guides, screws and nuts.

Especially preferred is a molding in the form of or as part of a socket, of a plug connector, of a plug or of a bushing. The molding preferably includes functional elements which require mechanical toughness. Examples of such functional elements are film hinges, snap-in hooks and spring tongues.

Possible uses in automobile interiors are for dashboards, steering-column switches, seat components, headrests, center consoles, gearbox components and door modules, and possible uses in automobile exteriors are for door handles, exterior mirror components, windshield wiper components, windshield wiper protective housings, grilles, roof rails, sunroof frames, engine covers, cylinder head covers, intake pipes, windshield wipers, and exterior bodywork parts.

Possible uses of polyamides with improved flow for the kitchen and household sector are for production of components for kitchen machines, for example fryers, smoothing irons, knobs, and also applications in the garden and leisure sector, for example components for irrigation systems or garden equipment and door handles.

The examples which follow serve to illustrate the invention, but without restricting it in any way.

EXAMPLES

The figures for the number-average molecular weight $M_n$ and for the weight-average molecular weight $M_w$ in the context of this invention are each based on a determination by means of gel permeation chromatography (GPC). For calibration, PMMA was used as a polymer standard with a low polydispersity.

Pressure figures in barg (gauge pressure, measured pressure) indicate the pressure over and above atmospheric pressure (of about 1 bar), i.e. the absolute pressure in bar is about 1 bar higher than the pressure in barg.

The feedstocks are introduced into the mixing tank at room temperature, and the tank is purged repeatedly with nitrogen and then closed. The temperature in the tank is heated by heating the tank wall until a clear salt solution forms. Then the solution is introduced continuously into the process.

Example 1

Preparation of a semiaromatic polyamide oligomer by oligomerization in a shell and tube reactor without back-mixing and without mass transfer with the environment, rapid heating of the output from the oligomerization, expansion of the output in a separate flash tank E2) and postpolymerization in the flash tank.

For the oligomerization, a 3-part shell and tube reactor with 13 tubes each of length 0.6 m and internal diameter 13 mm was used. The shell and tube reactor was heated by means of a heat exchanger. The feedstocks were oligomerized at internal temperature 230° C. for 1 hour and then at internal temperature 240° C. for a further 30 minutes, in each case at a pressure of 40 barg.

The output from the oligomerization was subjected to rapid heating in a heat exchanger operated at 35 barg and 320° C. and the pressure was reduced by means of a pressure-reducing valve.

The output from the heat exchanger was expanded in a separator (2 L Büchi vessel) to 7.5 barg and 320° C. and the water-containing gas phase formed was removed. The polyamide composition remained at these temperature and pressure values for about another 12 minutes for postpolymerization in the separator and was then discharged for analysis.

Feedstocks:
  41.188% by weight of terephthalic acid (TPA)
  17.652% by weight of isophthalic acid (IPA)
  41.16% by weight of hexamethylenediamine (HMD, added as a 70% solution in water)
  7.55% by weight of hexamethylenediamine (stoichiometric excess based on HMD)
  30% by weight of water, total amount
  300 ppm of sodium hypophosphite (NHP)

Results:
  Gel permeation chromatography (GPC—PMMA-calibrated)
  Molecular weight Mn 15 870 g/mol; polydispersity (PDI) 2.5
  Differential scanning calorimetry (DSC)
  Melting temperature (second run) $T_{m2}$ 314.5° C.; glass transition temperature (second run) $T_{g2}$ 133° C.; crystallization temperature ($T_k$) 275.6° C.; crystallization energy ($\Delta H_2$—second run) 54 J/g Example 2

For the polyamide preparation, the same apparatus as in example 1 was used.

For the oligomerization, the feedstocks were oligomerized at internal temperature 230° C. for 1 hour and then at internal temperature 240° C. for a further 30 minutes, in each case at a pressure of 40 barg. This was followed by rapid heating to 320° C. at 35 barg. The output from the heat exchanger was expanded to 7.5 barg at 320° C. and the water-containing gas phase formed was removed. The polyamide composition remained at these temperature and pressure values for about another 7 minutes for postpolymerization in the separator and was then discharged for analysis.

Feedstocks:
41.188% by weight of terephthalic acid (TPA)
17.652% by weight of isophthalic acid (IPA)
41.16% by weight of hexamethylenediamine (HMD, added as a 70% solution in water)
8.5% by weight of hexamethylenediamine (stoichiometric excess based on HMD)
30% by weight of water, total
300 ppm of sodium hypophosphite (NHP)

Results:
Gel permeation chromatography (GPC—PMMA-calibrated)
Molecular weight Mn 15 960 g/mol; polydispersity (PDI) 2.4
Differential scanning calorimetry (DSC)
Melting temperature (second run) $T_{m2}$ 313.3° C.; glass transition temperature (second run) $T_{g2}$ 133° C.; crystallization temperature ($T_k$) 271.7° C.; crystallization energy ($\Delta H_2$—second run) 57 J/g Example 3

For the polyamide preparation, the same apparatus as in example 1 was used.

For the oligomerization, the feedstocks were oligomerized at internal temperature 230° C. for 1 hour and then at internal temperature 240° C. for a further 30 minutes, in each case at a pressure of 40 barg. This was followed by rapid heating to 320° C. at 35 barg. The output from the heat exchanger was expanded to 5.7 barg at 320° C. and the water-containing gas phase formed was removed. The polyamide composition remained at these temperature and pressure values for about another 7 minutes for postpolymerization in the separator and was then discharged for analysis.

Feedstocks:
41.188% by weight of terephthalic acid (TPA)
17.652% by weight of isophthalic acid (IPA)
41.16% by weight of hexamethylenediamine (HMD, added as a 70% solution in water)
8.5% by weight of hexamethylenediamine (stoichiometric excess based on HMD)
30% by weight—water, total
300 ppm—sodium hypophosphite (NHP)

Results:
Gel permeation chromatography (GPC—PMMA-calibrated)
Molecular weight Mn 17 250 g/mol; polydispersity (PDI) 2.4
Differential scanning calorimetry (DSC)
Melting temperature (second run) $T_{m2}$ 313.9° C.; glass transition temperature (second run) $T_{g2}$ 133° C.; crystallization temperature ($T_k$) 271.3° C.; crystallization energy ($\Delta H_2$—second run) 53 J/g Example 4

For the polyamide preparation, the same apparatus as in example 1 was used.

For the oligomerization, the feedstocks were oligomerized at internal temperature 200° C. for 1 hour and then at internal temperature 240° C. for a further 30 minutes, in each case at a pressure of 45 barg. This was followed by rapid heating to 320° C. at 45 barg. The output from the heat exchanger was expanded to 6 barg at 320° C. and the water-containing gas phase formed was removed. The polyamide composition remained at these temperature and pressure values for about another 7 minutes for postpolymerization in the separator and was then discharged for analysis.

Feedstocks:
41.188% by weight of terephthalic acid (TPA)
17.652% by weight of isophthalic acid (IPA)
41.16% by weight of hexamethylenediamine (HMD, added as a 70% solution in water)
7.5% by weight of hexamethylenediamine (stoichiometric excess based on HMD)
30% by weight of water, total
300 ppm of sodium hypophosphite (NHP)

Results:
Gel permeation chromatography (GPC—PMMA-calibrated)
Molecular weight Mn 17 050 g/mol; polydispersity (PDI) 2.2
Differential scanning calorimetry (DSC)
Melting temperature (second run) $T_{m2}$ 316.1° C.; glass transition temperature (second run) $T_{g2}$ 132° C.; crystallization temperature ($T_k$) 276.8° C.; crystallization energy ($\Delta H_2$—second run) 53 J/g Example 5

For the polyamide preparation, the same apparatus as in example 1 was used.

For the oligomerization, the feedstocks were oligomerized at internal temperature 230° C. for 1 hour and then at internal temperature 240° C. for a further 30 minutes, in each case at a pressure of 40 barg. This was followed by rapid heating to 308° C. at 40 barg. The output from the heat exchanger was expanded to 4 barg at 307° C. and the water-containing gas phase formed was removed. The polyamide composition remained at these temperature and pressure values for about another 6 minutes for postpolymerization in the separator and was then discharged for analysis.

Feedstocks:
70% by weight of PA6/6T salt (Ultramid T® from BASF SE)
30% by weight of water, total
300 ppm of sodium hypophosphite (NHP)

Results:
Gel permeation chromatography (GPC—PMMA-calibrated)
Molecular weight Mn 14 680 g/mol; polydispersity (PDI) 2.7
Differential scanning calorimetry (DSC)
Melting temperature (second run) $T_{m2}$ 304.7° C.; glass transition temperature (second run) $T_{g2}$ 108° C.; crystallization temperature ($T_k$) 267.1° C.; crystallization energy ($\Delta H_2$—second run) 55 J/g Example 6 (Preparation of Polyamide-6,6)

For the polyamide preparation, the same apparatus as in example 1 was used.

For the oligomerization, the feedstocks were oligomerized at internal temperature 230° C. for 1 hour and then at internal temperature 240° C. for a further 30 minutes, in each case at a pressure of 35 barg. This was followed by rapid heating to 290° C. at 25 barg. The output from the heat exchanger was expanded to 4 barg at 290° C. and the water-containing gas phase formed was removed. The polyamide composition remained at these temperature and pressure values for about another 18 minutes for postpolymerization in the separator and was then discharged for analysis.

Feedstocks:
75% by weight of AH salt having a pH of 7.71
25% by weight of water
300 ppm of sodium hypophosphite (NHP)
Results:
Gel permeation chromatography (GPC—PMMA-calibrated)
Molecular weight Mn 14.590 g/mol; polydispersity (PDI) 2.4

Example 7 (Polyamide-6,6 Preparation with an Intermediate Expansion Stage)

For the polyamide preparation, the same apparatus as in example 1 was used, which additionally had a 2 l Büchi reactor as a flash tank between the oligomerization and the rapid heating.

For the oligomerization, the feedstocks were oligomerized at internal temperature 240° C. for 1 hour, at a pressure of 40 barg. This was followed by expansion to 27 barg at 240° C. for about 20 min and removal of the water-containing gas phase formed. This was followed by rapid heating to 300° C. at 30 barg. The output from the heat exchanger was expanded to 4 barg at 297° C. and the water-containing gas phase formed was removed. The polyamide composition remained at these temperature and pressure values for about another 18 minutes for postpolymerization in the separator and was then discharged for analysis.

Feedstocks:
70% by weight of AH salt having a pH of 7.71
30% by weight of water
300 ppm of sodium hypophosphite (NHP)
Results:
Gel permeation chromatography (GPC—PMMA-calibrated)
Molecular weight Mn 17 970 g/mol; polydispersity (PDI) 2.5

Example 8 (Polyamide Preparation with an Intermediate Expansion Stage)

For the polyamide preparation, the same apparatus as in example 7 was used

For the oligomerization, the feedstocks were oligomerized at internal temperature 240° C. for 1 hour, at a pressure of 40 barg. This was followed by expansion at 242° C. and 27 barg for about 30 min and removal of the water-containing gas phase formed. This was followed by rapid heating to 320° C. at 30 barg. The output from the heat exchanger was expanded to 15 barg at 320° C. and the water-containing gas phase formed was removed. The polyamide composition remained at these temperature and pressure values for about another 10 minutes for postpolymerization in the separator and was then discharged for analysis.

Feedstocks:
41.188% by weight of terephthalic acid (TPA)
17.652% by weight of isophthalic acid (IPA)
41.16% by weight of hexamethylenediamine (HMD, added as a 70% solution in water)
7.55% by weight of hexamethylenediamine (stoichiometric excess based on HMD)
30% by weight of water, total amount
300 ppm of sodium hypophosphite (NHP)
Results:
Gel permeation chromatography (GPC—PMMA-calibrated)
Molecular weight Mn 12 610 g/mol; polydispersity (PDI) 2.5

Example 9 (Polyamide Preparation with an Intermediate Expansion Stage)

For the polyamide preparation, the same apparatus as in example 7 was used.

For the oligomerization, the feedstocks were oligomerized at internal temperature 240° C. for 1 hour, at a pressure of 40 barg. This was followed by expansion at 242° C. and 31 barg for about 25 min and removal of the water-containing gas phase formed. This was followed by rapid heating to 320° C. at 30 barg. The output from the heat exchanger was expanded to 7 barg at 320° C. and the water-containing gas phase formed was removed. The polyamide composition remained at these temperature and pressure values for about another 8 minutes for postpolymerization in the separator and was then discharged for analysis.

Feedstocks:
41.188% by weight of terephthalic acid (TPA)
17.652% by weight of isophthalic acid (IPA)
41.16% by weight of hexamethylenediamine (HMD, added as a 70% solution in water)
7.55% by weight of hexamethylenediamine (stoichiometric excess based on HMD)
30% by weight of water, total amount
300 ppm of sodium hypophosphite (NHP)
Results:
Gel permeation chromatography (GPC—PMMA-calibrated)
Molecular weight Mn 12 700 g/mol; polydispersity (PDI) 2.5
Differential scanning calorimetry (DSC)
Melting temperature (second run) $T_{m2}$ 313° C.; glass transition temperature (second run) $T_{g2}$ 132° C.; crystallization temperature $(T_k)$ 271° C.; crystallization energy $(\Delta H_2$—second run) 54 J/g

Example 10 (Preparation of a Semiaromatic Amorphous Polyamide: 6I/6T)

Preparation of a semiaromatic polyamide oligomer by oligomerization in a shell and tube reactor without backmixing and without mass transfer with the environment, rapid heating of the output from the oligomerization, decompression in a separate flash tank E2) and postpolymerization in the flash tank.

For the oligomerization, a 2-part shell and tube reactor having 13 tubes each of length 0.6 m and internal diameter 13 mm was used. The shell and tube reactor was heated using a heat exchanger. The feedstocks were oligomerized at internal temperature 240° C. for 45 minutes and then at internal temperature 240° C. for a further 45 minutes, in each case at a pressure of 35 barg.

The pressure of the output from the oligomerization was reduced by means of a pressure-reducing valve. This was followed by rapid heating in a shell and tube heat exchanger to 322° C. at 30 barg.

The output from the heat exchanger was decompressed in a separator (2 L Büchi vessel) to 6 barg and 315° C., and the water-containing gas phase formed was removed. The polyamide composition remained at these temperature and pressure values for about another 13 minutes for postpolymerization in the separator, and then was discharged for analysis.

Feedstocks:
41.188% by weight of isophthalic acid (IPA)
17.652% by weight of terephthalic acid (TPA)
41.16% by weight of hexamethylenediamine (HMD, added as a 70% solution in water)
6.0% by weight of hexamethylenediamine (stoichiometric excess based on HMD)
30% by weight of water (total amount)
300 ppm of sodium hypophosphite (NHP)

Results:
Gel permeation chromatography (GPC—PMMA-calibrated)
Molecular weight Mn 15 900 g/mol; polydispersity (PDI) 2.6
Differential scanning calorimetry (DSC)
Glass transition temperature (second run) $T_{g2}$ 127° C.

Example 11 (Preparation of a Semiaromatic Amorphous Polyamide: Polyamide 6I/6T as in Example 11—with an Intermediate Decompression Stage)

For polyamide preparation, the same apparatus as in example 7 was used, which additionally had a 2 l Büchi reactor as flash tank between the oligomerization and the rapid heating.

For oligomerization, the feedstocks were oligomerized at internal temperature 240° C. for 1 hour, at a pressure of 35 barg. Subsequently, decompression was effected to 28 barg at 240° C. for about 20 min and the water-containing gas phase formed was removed. This was followed by rapid heating to 322° C. at 15.8 barg. The output from the heat exchanger was decompressed to 6 barg at 313° C. and the water-containing gas phase formed was removed. The polyamide composition remained at these temperature and pressure values for about another 13 minutes for postpolymerization in the separator, and then was discharged for analysis.

41.188% by weight of isophthalic acid (IPA)
17.652% by weight of terephthalic acid (TPA)
41.16% by weight of hexamethylenediamine (HMD, added as a 70% solution in water)
6.0% by weight of hexamethylenediamine (stoichiometric excess based on HMD)
30% by weight of water (total amount)
300 ppm of sodium hypophosphite (NHP)

Results:
Gel permeation chromatography (GPC—PMMA-calibrated)
Molecular weight Mn 15 500 g/mol; polydispersity (PDI) 2.4
Differential scanning calorimetry (DSC)
Glass transition temperature (second run) $T_{g2}$ 126° C.

The invention claimed is:

1. A process for continuously preparing an aliphatic or semiaromatic polyamide, comprising
   a) providing an aqueous composition comprising at least one component which is suitable for polyamide formation and is selected from the group consisting of dicarboxylic acids, diamines, salts of at least one dicarboxylic acid and at least one diamine, lactams, ω-amino acids, aminocarbonitriles, and mixtures thereof, and supplying the composition provided to an oligomerization zone,
   b) in the oligomerization zone, subjecting the composition to an oligomerization at a temperature of 170 to 290° C. and an absolute pressure of at least 20 bar, the oligomerization in step b) being effected without mass transfer with the environment, and a liquid output comprising polyamide oligomers is withdrawn from the oligomerization zone,
   c) optionally feeding the output from the oligomerization zone into a flash zone E1) and subjecting the output to expansion to obtain a water-containing gas phase and a liquid phase comprising the polyamide oligomers, and at least a portion of the water-containing gas phase is removed,
   d) subjecting the liquid output from the oligomerization zone or the liquid phase from the flash zone E1) to rapid heating to a temperature above a melting temperature $Tm_2$ of the aliphatic or semiaromatic polyamide, and
   e) feeding the heated composition from step d) into a flash zone E2) and expanding the heated composition to obtain a water-containing gas phase and a polyamide-containing liquid phase, removing at least a portion of the water-containing gas phase and subjecting the polyamide-containing phase to a postpolymerization at a temperature above the melting temperature $Tm_2$ of the aliphatic or semiaromatic polyamide.

2. The process according to claim 1, wherein the composition provided in step a) has a water content of 20 to 55% by weight, based on the total weight of the composition.

3. The process according to claim 1, wherein the polyamide is selected from the group consisting of PA 6.T, PA 9.T, PA8.T, PA 10.T, PA 12.T, PA 6.I, PA 8.I, PA 9.I, PA 10.I, PA 12.I, PA 6.T/6, PA 6.T/10, PA 6.T/12, PA 6.T/6.I, PA6.T/8.T, PA 6.T/9.T, PA 6.T/10T, PA 6.T/12.T, PA 12.T/6.T, PA 6.T/6.I/6, PA 6.T/6.I/12, PA 6.T/6.I/6.10, PA 6.T/6.I/6.12, PA 6.T/6.6, PA 6.T/6.10, PA 6.T/6.12, PA 10.T/6, PA 10.T/11, PA 10.T/12,PA 8.T/6.T, PA 8.T/66, PA 8.T/8.I, PA 8.T/8.6, PA 8.T/6.I, PA 10.T/6.T, PA 10.T/6.6, PA 10.T/10.I, PA 10T/10.I/6.T, PA 10.T/6.I, PA 4.T/4.I/46, PA 4.T/4.I/6.6, PA 5.T/5.I, PA 5.T/5.I/5.6, PA 5.T/5.I/6.6, PA 6.T/6.I/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/PACM.T, PA 6.T/MXDA.T, PA 6.T/6.I/8.T/8.I, PA 6.T/6.I/10.T/10.I, PA 6.T/6.I/IPDA.T/IPDA.I, PA 6.I/6.I/MXDA.T/MXDA.I, PA 6.T/6.I/MACM.T/MACM.I, PA 6.T/6.I/PACM.T/PACM.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T, and copolymers and mixtures thereof.

4. The process according to claim 1, wherein the polyamide oligomer is selected from the group consisting of PA 4, PA 5, PA 6, PA 7, PA 8, PA 9, PA 10, PA 11, PA 12, PA 46, PA 66, PA 666, PA 69, PA 610, PA 612, PA 96, PA 99, PA 910, PA 912, PA 1212 and copolymers and mixtures thereof.

5. The process according to claim 1, wherein the oligomerization zone used for oligomerization comprises at least one tubular reactor.

6. The process according to claim 1, wherein the oligomerization zone used for oligomerization is not back-mixed.

7. The process according to claim 1, wherein the oligomerization in step b) is effected monophasically in the liquid phase.

8. The process according to claim 1, wherein the temperature in the oligomerization zone in step b) is within a range from 200 to 290° C.

9. The process according to claim 1, wherein the absolute pressure in the oligomerization zone in step b) is within a range from 20 to 100 bar.

10. The process according to claim 1, wherein in step b), a residence time of the composition supplied in the oligomerization zone is within a range from 10 minutes to 6 hours.

11. The process according to claim 1, wherein the output from the oligomerization zone is expanded in step c) to an absolute pressure at least 5 bar below the pressure in the oligomerization zone.

12. The process according to claim 1, wherein the absolute pressure in the flash zone E1) in step c) is within a range from 10 to 50 bar.

13. The process according to claim 1, wherein the temperature in the flash zone E1) in step c) is within a range from 170 to 290° C.

14. The process according to claim 1, wherein the liquid phase obtained in step c) from the flash zone E1) has a water content of 10 to 30% by weight, based on the total weight of the liquid phase.

15. The process according to claim 1, in which no solid phase comprising polyamide oligomers is obtained in step c).

16. The process according to claim 1, wherein, if the output from the oligomerization zone is not subjected to any expansion in step c), the pressure is reduced before the rapid heating in step d).

17. The process according to claim 1, wherein the heating to a temperature above the melting temperature $Tm_2$ of the aliphatic or semiaromatic polyamide is effected in step d) within not more than 5 minutes.

18. The process according to claim 1, wherein the liquid output from the oligomerization zone or the liquid phase from the flash zone E1) is heated in step d) to a temperature of at least 310° C.

19. The process according to claim 1, wherein the rapid heating in step d) is effected with a heat exchanger.

20. The process according to claim 1, wherein the absolute pressure of the heated reaction mixture is reduced in step d) to a pressure of less than 35 bar.

21. The process according to claim 1, wherein the absolute pressure in the flash zone E2) is within a range from 2 to 15 bar.

22. The process according to claim 1, wherein the temperature in the flash zone E2) in step e) is at least 5° C. above the melting temperature $Tm_2$ of the aliphatic or semiaromatic polyamide and no solid phase comprising polyamide oligomers is obtained.

23. The process according to claim 1, wherein the residence time in the flash zone E2) for aliphatic polyamides in step e) is 1 minute to 60 minutes.

24. The process according to claim 1, wherein the residence time in the flash zone E2) for semiaromatic polyamides in step e) is 30 seconds to 15 minutes.

25. The process according to claim 1, wherein the flash zone E2) comprises at least one apparatus selected from unstirred or stirred flash tanks, strand devolatilizers, extruders, kneaders, other apparatuses having kneading and/or conveying elements, and combinations thereof.

26. The process according to claim 1, wherein the polyamides present in the output of the postpolymerization in step e) from the flash zone E2) have a number-average molecular weight $M_n$ in the range from 12,000 to 22,000 g/mol.

27. The process according to claim 1, wherein the polyamides present in the output of the postpolymerization in step e) from the flash zone E2) have a polydispersity PD of not more than 4.5.

28. The process according to claim 1, wherein the water phase obtained in step c) and/or that obtained in step e) is used at least partly for preparation of the aqueous composition in step a).

29. The process according to claim 1, wherein step e) is followed by withdrawal of an output from the flash zone E2) and the latter is then subjected to further processing selected from
devolatilization,
postcondensation,
compounding,
pelletization,
extrusion, and
combinations thereof.

30. The process according to claim 29, wherein the further processing comprises an extrusion.

* * * * *